(12) United States Patent
Kusama et al.

(10) Patent No.: US 12,074,340 B2
(45) Date of Patent: Aug. 27, 2024

(54) ELECTRODE GROUP, SECONDARY BATTERY, BATTERY PACK, AND VEHICLE

(71) Applicant: KABUSHIKI KAISHA TOSHIBA, Tokyo (JP)

(72) Inventors: Tomoe Kusama, Tokyo (JP); Kazuomi Yoshima, Yokohama (JP); Tetsuya Sasakawa, Yokohama (JP); Yasuhiro Harada, Isehara (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 49 days.

(21) Appl. No.: 17/179,480

(22) Filed: Feb. 19, 2021

(65) Prior Publication Data

US 2022/0085456 A1    Mar. 17, 2022

(30) Foreign Application Priority Data

Sep. 15, 2020    (JP) ................................. 2020-154463

(51) Int. Cl.
     *H01M 50/46*      (2021.01)
     *H01M 4/485*      (2010.01)
     (Continued)

(52) U.S. Cl.
     CPC ........... *H01M 50/46* (2021.01); *H01M 4/485* (2013.01); *H01M 4/62* (2013.01);
     (Continued)

(58) Field of Classification Search
     CPC ......... H01M 10/0525; H01M 10/0565; H01M 10/425; H01M 2004/027;
     (Continued)

(56) References Cited

U.S. PATENT DOCUMENTS 6,291,106 B1 *    9/2001    Daido ................. H01M 10/052
                                                                                              429/314
10,446,841 B2    10/2019    Yasuda et al.
     (Continued)

FOREIGN PATENT DOCUMENTS

JP            200152742 A      2/2001
JP            2002164084 A      6/2002
     (Continued)

OTHER PUBLICATIONS

Machine translation JP2009117162A (Year: 2009).*
Office Action issued on May 28, 2024, in corresponding Japanese Application No. 2020-154463, 5 pages.

*Primary Examiner* — Victoria H Lynch
(74) *Attorney, Agent, or Firm* — Maier & Maier, PLLC

(57) ABSTRACT

According to one embodiment, an electrode group is provided. The electrode group includes a positive electrode, a negative electrode, and a gel polymer layer interposed between the positive electrode and the negative electrode. At least a part of the negative electrode is opposed to the positive electrode. The gel polymer layer is formed of a gel electrolyte composed of a polymer material, an organic solvent and a lithium salt, and a sheet base member which supports the gel electrolyte, or the gel polymer layer is formed of only the gel electrolyte.

19 Claims, 8 Drawing Sheets

(51) Int. Cl.
  H01M 4/62 (2006.01)
  H01M 10/0525 (2010.01)
  H01M 10/0565 (2010.01)
  H01M 10/42 (2006.01)

(52) U.S. Cl.
  CPC ... H01M 10/0525 (2013.01); H01M 10/0565 (2013.01); H01M 10/425 (2013.01); *H01M 2010/4271* (2013.01); *H01M 2220/20* (2013.01); *H01M 2300/0082* (2013.01); *H01M 2300/0085* (2013.01)

(58) Field of Classification Search
  CPC ..... H01M 2010/4271; H01M 2220/20; H01M 2300/0082; H01M 2300/0085; H01M 4/485; H01M 4/62; H01M 50/46; Y02E 60/10
  See application file for complete search history.

(56) References Cited

U.S. PATENT DOCUMENTS

| | | | |
|---|---|---|---|
| 2002/0090555 A1* | 7/2002 | Noh | H01M 10/0565 429/317 |
| 2007/0224503 A1 | 9/2007 | Tsuda et al. | |
| 2008/0124623 A1 | 5/2008 | Hisamitsu et al. | |
| 2008/0220333 A1* | 9/2008 | Yano | H01M 50/44 429/301 |
| 2015/0079480 A1 | 3/2015 | Ahn et al. | |
| 2015/0318570 A1* | 11/2015 | Choi | H01M 50/426 429/303 |
| 2018/0123177 A1* | 5/2018 | Wang | H01M 10/441 |
| 2018/0277843 A1* | 9/2018 | Yasuda | H01M 4/485 |
| 2019/0296390 A1 | 9/2019 | Yoshima et al. | |
| 2022/0123361 A1* | 4/2022 | Lee | H01M 10/058 |

FOREIGN PATENT DOCUMENTS

| | | | | |
|---|---|---|---|---|
| JP | 2005235683 A | | 9/2005 | |
| JP | 2007265661 A | | 10/2007 | |
| JP | 2008-159576 A | | 7/2008 | |
| JP | 2009117162 A | * | 5/2009 | ........ H01M 10/0565 |
| JP | 2010135265 A | | 6/2010 | |
| JP | 2013152825 A | | 8/2013 | |
| JP | 2015525452 A | | 9/2015 | |
| JP | 2018-160420 A | | 10/2018 | |
| JP | 2019169252 A | | 10/2019 | |
| WO | WO-2020167022 A1 | * | 8/2020 | ............ H01G 11/56 |

* cited by examiner

ELECTRODE GROUP, SECONDARY BATTERY, BATTERY PACK, AND VEHICLE

CROSS-REFERENCE TO RELATED APPLICATIONS

This application is based upon and claims the benefit of priority from Japanese Patent Application No. 2020-154463, filed Sep. 15, 2020, the entire contents of which are incorporated herein by reference.

FIELD

Embodiments described herein relate generally to an electrode group, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. $Li/Li^+$) relative to metallic lithium, which is higher (i.e., more noble) in comparison to potentials of carbon based negative electrodes. The potential of an oxide of titanium is attributed to the redox reaction between $Ti^{3+}$ and $Ti^{4+}$ upon electrochemical insertion and extraction of lithium, and is therefore electrochemically restricted. It is also a fact that rapid charge/discharge of lithium ions can be performed stably at a high electrode potential of about 1.5 V (vs. $Li/Li^+$).

On the other hand, considering the capacity per unit weight, the theoretical capacity of titanium dioxide (anatase structure) is about 165 mAh/g, and the theoretical capacity of spinel type lithium-titanium composite oxides such as $Li_4Ti_5O_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced. In consideration of the above, a new electrode material containing Ti and Nb has been examined. Such a material containing a niobium-titanium composite oxide is expected to have a high charge-and-discharge capacity. Particularly, a composite oxide represented by $TiNb_2O_7$ has a high theoretical capacity exceeding 380 mAh/g. However, when a large quantity of moisture remains in the electrode, protons are generated by electrolysis of the moisture at a time of charge and discharge. A gas generation amount increases due to the generated protons, and the battery resistance increases, thus causing a decrease in input/output characteristics and a decrease in cycle life characteristics.

DETAILED DESCRIPTION

Figure 1:
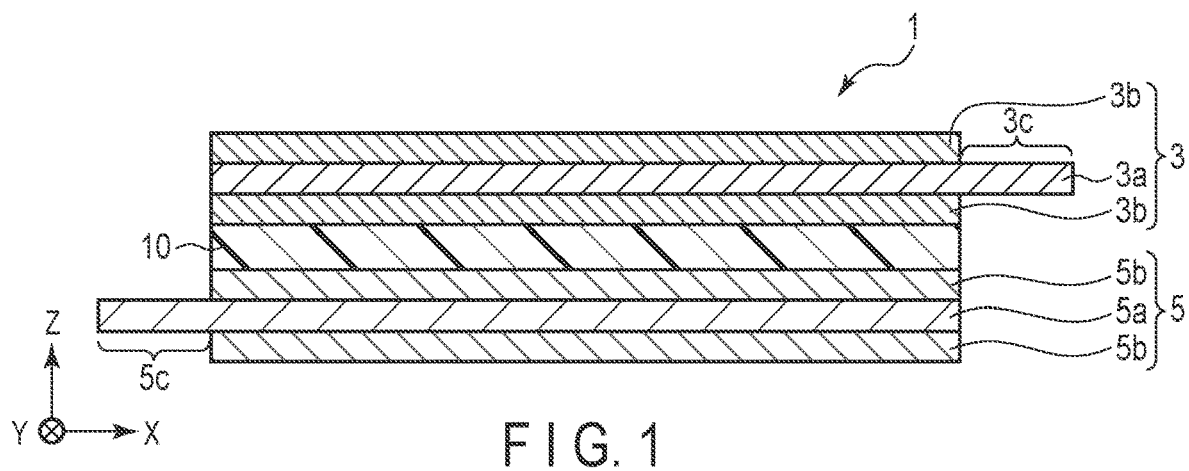
FIG. 1 is a cross-sectional view schematically illustrating an example of an electrode group according to an embodiment.

According to one embodiment, an electrode group is provided. The electrode group includes a positive electrode, a negative electrode, and a gel polymer layer interposed between the positive electrode and the negative electrode. At least a part of the negative electrode is opposed to the positive electrode. The gel polymer layer is formed of a gel electrolyte composed of a polymer material, an organic solvent and a lithium salt, and a sheet base member which supports the gel electrolyte, or the gel polymer layer is formed of only the gel electrolyte.

According to another embodiment, a secondary battery is provided. The secondary battery includes an electrode group according to the embodiment, and an electrolyte.

According to another embodiment, a battery pack is provided. The battery pack includes the secondary battery according to the embodiment.

According to another embodiment, a vehicle is provided. The vehicle includes the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

Conventionally, in order to decrease the electrode resistance, an attempt has been made to reduce the binder amount in the electrode. However, if the binder amount is reduced, the binding force between electrode materials, such as active materials constituting the electrodes, lowers. Consequently, when the electrode is dried, there is a possibility that a crack occurs in the active material-containing layer and that the active material-containing layer peels from the current collector. If the crack or peeling of the active material-containing layer occurs, for example, the input/output characteristics and cycle life characteristics deteriorate due to an increase in resistance, and the battery characteristics are adversely affected.

Thus, at the time of drying the electrode, the moisture in the active material-containing layer is not completely dried, thereby suppressing, to some degree, the crack in the active material-containing layer and the peeling from the current collector. However, in the electrode including the active material-containing layer which contains a large quantity of moisture, protons are generated by decomposition of water at the time of charge and discharge, and part of the generated protons may further change to hydrogen. If a gas generation amount increases in this manner, there arises, eventually, the problem that the battery resistance increases.

In water, by electrolysis, an oxidation reaction expressed by a formula 1 below occurs at a high potential, and a reduction reaction expressed by a formula 2 below occurs at a low potential. In the oxidation reaction and the reduction reaction, oxygen gas and hydrogen gas are generated, respectively. In the negative electrode with a low reaction potential, the reduction reaction expressed by the formula 2 tends to progress. In the positive electrode with a high reaction potential, the oxidation reaction expressed by the formula 1 tends to progress.

$$2H_2O \Leftrightarrow O_2\uparrow + 4H^+ + 4e^- \tag{1}$$

$$H_2O + H^+ + 2e^- \Leftrightarrow H_2\uparrow + OH^- \tag{2}$$

It is understood that when protons are in a state of being freely capable of electrophoresis between the positive and negative electrodes, for example, the reduction reaction expressed by the formula 2 progresses, and hydrogen tends to be easily generated at the negative electrode. The inventors discovered that the electrophoresis of protons between the positive and negative electrodes can be suppressed by interposing a gel polymer layer between the positive and negative electrodes.

First Embodiment

According to a first embodiment, an electrode group is provided. The electrode group includes a positive electrode, a negative electrode, and a gel polymer layer interposed between the positive electrode and the negative electrode. At least a part of the negative electrode is opposed to the positive electrode. The gel polymer layer is formed of a gel electrolyte composed of a polymer material, an organic solvent and a lithium salt, and a sheet base member which supports the gel electrolyte, or the gel polymer layer is formed of only the gel electrolyte.

Although the reason why the proton motion between the positive and negative electrode can be suppressed by the interposition of the gel polymer layer between the positive and negative electrodes is unclear, it is considered that the polymer material included in the gel polymer layer hinders the proton motion. If the proton motion is suppressed, the hydrogen gas generation at the negative electrode, for example, is suppressed. Thus, an increase in battery resistance is suppressed, and excellent input/output characteristics and excellent cycle life characteristics can be achieved.

Hereinafter, the electrode group according to the embodiment will be described in detail.

The electrode group includes a positive electrode, a negative electrode, and a gel polymer layer interposed between the positive electrode and the negative electrode. The electrode group can further include a separator interposed between the positive electrode and the negative electrode. When the electrode group further includes the separator between the positive electrode and the negative electrode, the gel polymer layer may be included, for example, between the positive electrode and the separator or between the negative electrode and the separator. The gel polymer layer may be present between the positive electrode and the separator, and between the negative electrode and the separator.

(A) Gel Polymer Layer

The gel polymer layer is composed of, for example, a sheet base member and a gel electrolyte which is held by the sheet base member. The gel polymer layer may be composed of only the gel electrolyte. In other words, the sheet base member, which the gel polymer layer may include, can be omitted. The gel polymer layer composed of only the gel electrolyte can also be treated as an independent film having a sheet shape. The independent film may be, for example, a gel polymer sheet including a polymer chain formed of a polymer material, an organic solvent, and a lithium salt. When only the gel polymer layer is interposed between the positive and negative electrodes, the distance between the positive and negative electrodes can be reduced. Thus, the advantageous effect of the gas generation suppression by the gel polymer layer can be obtained, and the electrical resistance can be reduced. The gel polymer layer may be a multilayer body in which two or more such gel polymer layers are stacked.

At least a part of the gel polymer layer may be impregnated in at least one of the positive electrode and the negative electrode. In this case, the gel polymer layer may not include the sheet base member, or may include the sheet base member. When the gel polymer layer does not include the sheet base member, the electrical insulation between the positive and negative electrodes can be secured, for example, by increasing the thickness of the gel polymer layer to some degree, or by interposing the separator between the positive and negative electrodes. If the gel polymer layer is impregnated in at least one of the positive electrode and negative electrode, it can be said that the gel polymer layer is interposed between the positive and negative electrodes, since the gel polymer layer exists on the surface of the positive electrode or negative electrode in which the gel polymer layer is impregnated.

The thickness of the gel polymer layer is, for example, in a range of 0.01 μm to 300 μm, and preferably, in a range of 0.1 μm to 100 μm. When the gel polymer layer is impregnated in at least one of the positive electrode and negative electrode, the thickness of the gel polymer layer may be in a range of 0.01 μm to 50 μm. When the thickness of the gel polymer layer is small, for example, when the gel electrolyte is impregnated in at least one of the positive electrode and negative electrode, the battery resistance can be reduced and this is preferable. If the gel polymer layer is excessively thick, the battery resistance increases and this is not preferable. When the gel polymer layer is present as an independent film (i.e., when the gel polymer layer is not substantially impregnated in the positive or negative electrode), the thickness of the gel polymer layer may be, for example, in a range of 1 μm to 300 μm. When the separator is not present between the positive and negative electrodes, and when only the gel polymer layer is present therebetween, the thickness of the gel polymer layer may be, for example, in a range of 5 μm to 300 μm.

The sheet base member holds, for example, the gel electrolyte, and makes it possible to treat the gel polymer layer as an independent film. However, as described above, the gel electrolyte alone can be treated as an independent film. In addition, the sheet base member can function as an insulative base member for securing the insulation between the positive and negative electrodes. The sheet base member may be a porous independent film in which the gel electrolyte can be impregnated. The gel electrolyte can be held in the sheet base member by being impregnated in the sheet base member. Thus, the sheet base member is preferably a porous independent film having a certain degree of porosity.

The porosity of the sheet base member is, for example, in a range of 15% to 80%, and preferably, in a range of 20% to 70%. If the porosity of the sheet base member is excessively low, the gel electrolyte is not easily impregnated into the inside of the sheet base member, and there is a possibility that the lithium ion conductivity lowers and the input/output characteristics lower. If the porosity of the sheet base member is excessively high, there is a possibility that the gel electrolyte cannot be held. In this case, the gel electrolyte flows out, and the advantageous effect of suppressing the motion of protons between the electrodes cannot easily be obtained, and this is not preferable.

Examples of the sheet base member include porous independent films such as nonwoven fabric, a porous film, and paper, and an organic fiber layer formed on the electrode surface such that the organic fiber layer is integral with the electrode. The organic fiber layer may be a sheet-type film having a porous structure. The organic fiber layer may be a layer which can be formed by electrospinning. The gel polymer layer may include one kind of sheet base member, or may include two or more kinds of sheet base members.

Examples of the materials that form the nonwoven fabric and porous film include polyolefins such as polyethylene and polypropylene, and cellulose. If these materials are used as the sheet base member, excellent flexibility and strength can be obtained, and there is a merit that the handling is easy.

The organic fiber layer includes at least one organic material selected from the group consisting of polyamide-imide (PAI), polyetherimide (PEI), polyimide (PI), polyamide (PA), polyvinylidene fluoride (PVdF), polyethylene, polypropylene, polytetrafluoroethylene (PTFE), polyphenylenesulfide (PPS), liquid crystal polyester (LCP), polyether sulfone (PES), polyether ketone (PEK), polyether ether ketone (PEEK), polyethylene terephthalate (PET), cellulose, polyolefin, polyketone, polysulfone, and polyvinyl alcohol (PVA).

In general, PVdF and PI are regarded as materials which are difficult to form in a fibrous shape. However, by adopting the electrospinning, such materials can be formed as fibrous layers. The number of kinds of organic materials that the organic fiber layer includes may be one, or two or more.

The thickness of the sheet base member is, for example, in a range of 5 μm to 40 μm, and preferably, in a range of 5 μm to 20 μm. If the sheet base member is excessively thick, the distance between the positive and negative electrodes becomes too great, and the battery resistance increases, and this is not preferable.

The gel electrolyte included in the gel polymer layer is composed of a polymer material, an organic solvent and a lithium salt. Polymer chains, which constitute a polymer material, are three-dimensionally intertwined, and the electrolyte including the organic solvent and lithium salt is held in the inside of the polymer chains. As described above, the polymer material included in the gel electrolyte can suppress the proton motion between the positive and negative electrodes. On the other hand, the gel electrolyte has lithium ion conductivity. Note that the electrolyte included in the gel electrolyte can include a small amount of an additive.

The ratio of the mass of the polymer material in the gel electrolyte is, for example, in a range of 0.5 mass % to 10 mass %, and preferably, in a range of 1.5 mass % to 8 mass %. If this ratio is excessively small, there is a possibility that the gel electrolyte is not properly gelled, and there is a tendency that the advantageous effect of suppressing the proton motion between the positive and negative electrodes is not easily obtained. If this ratio is excessively large, there is a tendency that the ion conduction resistance excessively increases and the input/output characteristics become poor.

The ratio of the mass of the organic solvent in the gel electrolyte is, for example, in a range of 80 mass % to 97 mass %, and preferably, in a range of 80 mass % to 90 masse. By properly adjusting the ratio of the mass of the organic solvent in the gel electrolyte, it is possible to adjust the concentration (mass ratio) of the polymer material and the concentration of the lithium salt.

The lithium salt concentration in the gel electrolyte is, for example, in a range of 0.5 mol/L to 3 mol/L, and preferably, in a range of 0.5 mol/L to 2 mol/L. By setting the lithium salt concentration in this range, the viscosity of the electrolyte becomes proper, and a relatively high ion conductivity can be maintained.

The gel electrolyte is prepared, for example, by mixing an electrolytic solution substantially consisting of an organic solvent and a lithium salt and a solution (post-polymer liquid) including a post-polymer that is a precursor of a polymer material, and polymerizing the post-polymer. A concrete method of manufacturing the gel electrolyte will be described later.

The post-polymer may be a monomer which is a precursor of a polymer material (to be described later), and/or an oligomer. The post-polymer is, for example, a material which is gelled with carbonates, such as polymethyl methacrylate.

The weight average molecular weight of the polymer material is, for example, 3,000 or more. The weight average molecular weight of the polymer material is, preferably, 3,000 or more and 5,000,000 or less, and more preferably, 5,000 or more and 2,000,000 or less, and still more preferably, 10,000 or more and 1,000,000 or less. If the weight average molecular weight of the polymer material is excessively low, the gel electrolyte becomes loose, and there is a possibility that the handling of the gel polymer layer becomes difficult. For example, it may become difficult to stay the gel polymer layer on the electrode surface. The weight average molecular weight of the polymer material can be calculated by gel permeation chromatography (GPC).

The polymer material can be a polymer made of a single monomer unit, a copolymer made of a plurality of monomer units, or a mixture thereof. The polymer material preferably contains a monomer unit constituted by a hydrocarbon with a functional group including one type or two or more types of elements selected from the group consisting of oxygen (O), sulfur (S), nitrogen (N), and fluorine (F). In the polymer material, the ratio of a portion formed from the monomer unit is preferably 70 mol % or more. The monomer unit will be referred to as a first monomer unit hereinafter. Additionally, in a copolymer, a monomer unit other than the first monomer unit will be referred to as a second monomer unit. The copolymer of the first monomer unit and the second monomer unit may be an alternating copolymer, a random copolymer, or a block copolymer.

In the polymer material, if the ratio of the part composed of the first monomer unit is less than 70 mol %, there is concern that the capability of shutting off the proton motion by the gel polymer layer lowers. The ratio of the portion formed from the first monomer unit in the polymer material is preferably 90 mol % or more. More preferably, the ratio of the portion formed from the first monomer unit in the polymer material is preferably 100 mol %, that is, the polymer material is a polymer formed from only the first monomer unit.

The first monomer unit may be a compound whose side chain has a functional group including one type or two or more types of elements selected from the group consisting of oxygen (O), sulfur (S), nitrogen (N), and fluorine (F) and whose main chain is formed from a carbon-to-carbon bond. The hydrocarbon may have one type or two or more types of functional groups each including one type or two or more types of elements selected from the group consisting of oxygen (O), sulfur (S), nitrogen (N), and fluorine (F). The above-described functional group in the first monomer unit can enhance the conductivity of lithium ions which pass through the gel polymer layer.

It is preferable that the hydrocarbon, which constitutes the first monomer unit, includes a functional group including at least one kind of element selected from the group consisting of oxygen (O), sulfur (S) and nitrogen (N). If the first monomer unit includes such a functional group, there is a tendency that the conductivity of lithium ions in the gel polymer layer is further enhanced, and that the internal resistance lowers.

The functional group contained in the first monomer unit is preferably at least one functional group selected from the group consisting of a formal group, a butyral group, a carbonylmethyl ester group, an acetyl group, a carbonyl group, a hydroxy group, and a fluoro group. In addition, the first monomer unit preferably contains at least one of a carbonyl group and a hydroxy group in a functional group, and more preferably contains both of them.

Examples of the first monomer unit include at least one selected from the group consisting of vinyl formal, vinyl alcohol, vinyl acetate, vinyl acetal, vinyl butyral, acrylic acid and derivatives thereof, methacrylic acid and derivatives thereof, acrylonitrile, acrylamide and derivatives thereof, styrene sulfonic acid, polyvinylidene fluoride, and tetrafluoroethylene.

The second monomer unit is a compound other than the first monomer unit, that is, a hydrocarbon that does not have a functional group including one type or two or more types of elements selected from the group consisting of oxygen (O), sulfur (S), nitrogen (N), and fluorine (F), or a material that has the functional group but is not a hydrocarbon. Examples of the second monomer unit are ethylene oxide and styrene can be used. Examples of a polymer formed from the second monomer unit are polyethylene oxide (PEO) and polystyrene (PS).

The types of the functional groups contained in the first monomer unit and the second monomer unit can be identified by infrared spectroscopy (Fourier Transform Infrared Spectroscopy: FT-IR). Whether the first monomer unit is formed from a hydrocarbon can be determined by nuclear magnetic resonance (NMR). In the copolymer of the first monomer unit and the second monomer unit, the ratio of the portion formed from the first monomer unit can be calculated by NMR.

The polymer material is, preferably, at least one kind selected from the group consisting of polyvinylidene fluoride (PVdF), polyacrylonitrile (PAN), polymethyl methacrylate (PMMA) and polyethylene oxide (PEO). The polymer material may be one kind of these, or may be a mixture including two or more kinds of these.

It is preferable that the gel electrolyte does not include inorganic particles. When the gel electrolyte does not include inorganic particles, the amount of the electrolytic solution per unit volume in the gel polymer layer (the mass of the organic solvent and lithium salt) can be increased. Therefore, in this case, the lithium ion conductivity in the gel polymer layer can be increased. As a result, excellent input/output characteristics and, by extension, excellent cycle life characteristics, can be achieved.

Examples of the organic solvent may include cyclic carbonates such as propylene carbonate (PC), ethylene carbonate (EC), and vinylene carbonate (VC); linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GBL), acetonitrile (AN), and sulfolane (SL). The organic solvents may be used alone or as a mixed solvent.

Examples of the lithium salt include lithium perchlorate (LiClO$_4$), lithium hexafluorophosphate (LiPFG), lithium tetrafluoroborate (LiBF$_4$), lithium hexafluoroarsenate (LiAsF$_6$), lithium trifluoromethansulfonate (LiCF$_3$SO$_3$), and lithium bistrifluoromethylsulfonylimide (LiN(CF$_3$SO$_2$)$_2$), and mixtures thereof. The electrolyte salt which is not easily oxidized even at a high potential is preferable, and LiPF$_6$ is most preferable.

Examples of the additive, which the gel electrolyte can include, include vinylene carbonate, hexamethylene diisocyanate, tris(trimethylsilyl)phosphate, fluoroetheylene carbonate, lithium bis(trifluoromethane sulfonil)imide, lithium bis(fluorosulfonil)imide, propanesulton, and bis oxalate bolate.

The gel electrolyte is obtained, for example, by leaving a mixture of an electrolytic liquid and a post-polymer liquid to stand for a sufficient time period at temperatures not lower than a temperature at which a gelling reaction of a post-polymer can occur, and gelling the mixture liquid. It is preferable that the gel electrolyte is prepared in an inert atmosphere such as Ar gas. When the mixture liquid is prepared, the electrolytic liquid including the organic solvent and the lithium salt, and the post-polymer liquid are mixed at a mass ratio of, for example, 1:1 to 5:1. The concentration of the post-polymer in the post-polymer liquid is, for example, in a range of 0.5 mass to 20 mass %.

In one example of the case in which the gel electrolyte is supported in the sheet base member, the sheet base member is first immersed in the mixture liquid of the electrolytic liquid and the post-polymer liquid, and the mixture liquid is impregnated in the sheet base member. At this time, the mixture liquid may be impregnated in the inside of the sheet base member by placing the mixture liquid and the sheet base member in a reduced-pressure environment. In the state in which the mixture liquid is impregnated in the sheet base member, the mixture liquid and the sheet base member are left to stand for a sufficient time period at temperatures not lower than a temperature at which a gelling reaction can occur, and the mixture liquid is gelled. Thereby, a gel polymer layer, in which the gel electrolyte is supported in the inside of the sheet base member and on the surfaces of the sheet base member, can be obtained. Instead of the sheet base member, the positive electrode or negative electrode may be subjected to the above-described operation. Thereby, the gel electrolyte can be supported (impregnated) in the positive electrode active material-containing layer or negative electrode active material-containing layer.

<Analysis of Gel Polymer Layer>

A secondary battery is disassembled in a globe box with an argon atmosphere, and an electrode group is taken out. The taken-out electrode group is immersed in an organic solvent such as ethylene carbonate, and the electrolytic liquid and lithium salt are removed from the positive electrode and negative electrode. When the electrode group includes a separator, the separator is removed. When the gel electrolyte is impregnated in the sheet material, gel permeation chromatography is performed on a solid content remaining on the surface or in the inside of the sheet material. On the other hand, when the gel electrolyte is impregnated in the electrode (positive electrode or negative electrode), gel permeation chromatography is performed on a solid content remaining on the surface or in the inside of the electrode. In this manner, the molecular weight of the polymer material, which the gel electrolyte includes, can be calculated.

The polymer material included in the gel polymer layer can be identified by the procedure described below. To begin with, the secondary battery is disassembled by the above-described procedure, and the gel electrolyte included in the gel polymer layer is extracted by using a proper solvent. As the proper solvent, a solvent, which does not dissolve a binder that may be included in the electrode, and which dissolves the polymer material, is selected. In order to select such a solvent, the identification of the binder may be performed before the identification of the polymer material. Structural analysis is enabled by performing NMR and infrared spectroscopy (IR) on the polymer material obtained by the extraction. In addition, elemental analysis may be performed by inductively coupled plasma (ICP) emission spectroscopy. Thus, the identification of the polymer material can be conducted. Further, the content of the polymer material in the gel polymer layer can be calculated by a mass ratio by measuring, in advance, the weight of the electrode group before disassembling the electrode group, and then measuring the weight of the electrode group once again after the extraction of the polymer material.

(B) Negative Electrode

The negative electrode may include a negative electrode current collector and a negative electrode active material-containing layer. The negative electrode active material-containing layer may be formed on both surfaces or one surface of the negative electrode current collector. The negative electrode active material-containing layer can contain a negative electrode active material, and optionally a conductive agent and a binder. A gel electrolyte serving as a gel polymer layer may be impregnated in the negative electrode active material-containing layer. Whether or not the gel electrolyte is impregnated in the negative electrode active material-containing layer can be confirmed by the above-described gel permeation chromatography.

Examples of the negative electrode active material include lithium titanate (e.g. Li$_{2+y}$Ti$_3$O$_7$, 0≤y≤3) having a ramsdellite structure, lithium titanate (e.g. Li$_{4+x}$Ti$_5$O$_{12}$, 0≤x≤3) having a spinel structure, monoclinic titanium dioxide (TiO$_2$), anatase-type titanium dioxide, rutile-type titanium dioxide, a hollandite-type titanium composite oxide, a monoclinic niobium titanium composite oxide, an orthorhombic titanium-containing composite oxide. From the standpoint that both a high capacity and high rate characteristics can consistently be achieved, it is preferable that the negative electrode active material includes the monoclinic niobium titanium composite oxide among these materials. As the negative electrode active material, only the monoclinic niobium titanium composite oxide may be included.

Examples of the monoclinic niobium titanium composite oxide include a compound represented by Li$_x$Ti$_{1-y}$M1$_y$Nb$_{2-z}$M2$_z$O$_{7+\delta}$. Here, M1 is at least one selected from the group consisting of Zr, Si, and Sn. M2 is at least one selected from the group consisting of V, Ta, and Bi. The respective subscripts in the composition formula are specified as follows: 0≤x≤5, 0≤y<1, 0≤z<2, and −0.3≤δ≤0.3. Specific examples of the monoclinic niobium titanium composite oxide include Li$_x$Nb$_2$TiO$_7$ (0≤x≤5).

Another example of the monoclinic niobium titanium composite oxide is a compound represented by Ti$_{1-y}$M3$_{y+z}$Nb$_{2-z}$O$_{7-\delta}$. Here, M3 is at least one selected from Mg, Fe, Ni, Co, W, Ta, and Mo. The respective subscripts in the composition formula are specified as follows: 0≤y<1, 0≤z≤2, and −0.3≤δ≤0.3.

Examples of the orthorhombic titanium-containing composite oxide include a compound represented by Li$_{2+a}$M(I)$_{2-b}$Ti$_{6-c}$M(II)$_d$O$_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b \leq 2$, $0 \leq c < 6$, $0 \leq d < 6$, and $-0.5 \leq o \leq 0.5$. Specific examples of the orthorhombic titanium-containing composite oxide include $Li_{2+a}Na_2Ti_6O_{14}$ ($0 \leq a \leq 6$).

A conductive agent is added in order to increase the current-collecting performance and to suppress the contact resistance between the active material and the current collector. Examples of the conductive agent include carbonaceous materials such as vapor grown carbon fiber (VGCF), carbon black such as acetylene black, and graphite. The conductive agents may be used alone or as a mixture of two or more kinds. Alternatively, instead of using the conductive agent, carbon coating or electron conductive inorganic material coating may be performed on surfaces of the active material particles.

A binder is added in order to fill a gap between dispersed active materials and to bind the active material and the negative electrode current collector. Examples of the binder include polytetrafluoroethylene (PTFE), polyvinylidene fluoride (PVdF), fluorine rubber, styrene butadiene rubber, polyacrylic acid compound, imide compound, carboxymethyl cellulose (CMC), and salts of CMC. The binders may be used alone or as a mixture of two or more kinds.

A compounding ratio of the negative electrode active material, the conductive agent and the binder in the negative electrode active material-containing layer can be appropriately changed according to the application of the negative electrode. It is preferable that the negative electrode active material, the conductive agent, and the binder are respectively added in a proportion within a range of 70% by mass to 96% by mass, 2% by mass to 28% by mass, and 2% by mass to 28% by mass. When the content of the conductive agent is not less than 2% by mass, the current-collecting performance of the negative electrode active material-containing layer can be improved. In addition, when the content of the binder is not less than 2% by mass, the binding property between the negative electrode active material-containing layer and the current collector is sufficient, and the excellent cycle performance can be expected. On the other hand, in order to make the capacity higher, it is preferable that the contents of the conductive agent and the binder are respectively not more than 28% by mass.

The negative electrode current collector is formed a material which is electrochemically stable at a potential at which lithium (Li) is inserted into and extracted from the active material, for example, a potential higher than 1.0 V (vs. $Li/Li^+$). For example, the current collector is preferably made of copper, nickel, stainless steel or aluminum, or an aluminum alloy including at least one element selected from Mg, Ti, Zn, Mn, Fe, Cu, and Si. The thickness of the current collector is preferably 5 μm to 20 μm. The current collector having such a thickness can achieve a balance between the strength and reduction in weight of the electrode.

The negative electrode current collector may include a portion where the negative electrode active material-containing layer is not formed on a surface of the negative electrode current collector. This portion can serve as a negative electrode tab.

The density of the negative electrode active material-containing layer (not including the current collector) is preferably 1.8 g/cm³ to 2.8 g/cm³. The negative electrode, in which the density of the negative electrode active material-containing layer is within this range, is excellent in terms of energy density and holding property of the electrolyte. The density of the negative electrode active material-containing layer is more preferably 2.1 g/cm³ to 2.6 g/cm³.

The moisture content in the negative electrode active material-containing layer is, for example, 150 ppm to 500 ppm. If the moisture content is excessively small, there is a possibility that a crack occurs in the active material-containing layer and that the active material-containing layer peels from the current collector. If the moisture content is excessively large, the hydrogen gas occurring at the time of the charge and discharge cycle increases, and this is not preferable. Note that it is assumed that the moisture content is measured at a time point after the shipment of the secondary battery (after the initial charge and discharge).

The method of measuring the moisture content in the negative electrode active material-containing layer will be described.

The electrode is extracted from the battery and an electrode piece having a size of 3 mm×2 cm is prepared. Drying the prepared electrode piece should be avoided until the water content is measured. Specifically, for example, after the electrode pieces are prepared, the electrode pieces are stored in a sealed container and taken to a measuring device. Alternatively, the electrode is disassembled at a place where the measuring device is located, and measurement is performed at that place.

For the sample prepared as described above, the water content is measured by a coulometric titration method using a Karl Fischer moisture meter (model VA-06, manufactured by Mitsubishi Chemical Analytech). Specifically, the measurement is performed under the condition that the sample is heated to 140° C. and nitrogen gas is introduced at a flow rate of 200 ml/min. The content of water is converted from the amount of electricity consumed in the reaction between water and iodine.

The negative electrode can be fabricated, for example, by the following method. To start with, a negative electrode active material, a conductive agent and a binder are suspended in a solvent, and thus a slurry is prepared. Examples of the solvent include water, and N-methyl-2-pyrrolidone (NMP). As described above, when water is used as the solvent, even if the amount of the binder is decreased, the crack in the active material-containing layer and the peeling from the current collector at the time of drying a coating film (active material-containing layer) can be suppressed by leaving the moisture in the active material-containing layer to some degree. The prepared slurry is coated on one surface or both surfaces of the negative electrode current collector. Then, the coated slurry is dried, and a multilayer body of the negative electrode active material-containing layer and the negative electrode current collector is obtained. Thereafter, the multilayer body is subjected to pressing. Thus, the negative electrode is fabricated.

Alternatively, the negative electrode may be fabricated by the following method. To begin with, a negative electrode active material, a conductive agent and a binder are mixed, and a mixture is obtained. Then, the mixture is formed into pellets. Then, the pellets are disposed on the negative electrode current collector, and thus the negative electrode can be obtained.

(C) Positive Electrode

The positive electrode can include a positive electrode current collector and a positive electrode active material-containing layer. The positive electrode active material-containing layer can be formed on one side or both sides of the positive electrode current collector. The positive electrode active material-containing layer can contain a positive electrode active material, and optionally a conductive agent and a binder. A gel electrolyte serving as a gel polymer layer may be impregnated in the positive electrode active material-containing layer. Whether or not the gel electrolyte is impregnated in the positive electrode active material-containing layer can be confirmed by the above-described gel permeation chromatography.

Examples of the positive electrode active material include oxides and sulfides. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese cobalt composite oxides (e.g., $Li_xMn_yCo_{1-y}O_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium phosphates having an olivine structure (e.g., $Li_xFePO_4$; $0<x\le1$, $Li_xFe_{1-y}Mn_yPO_4$; $0<x\le1$, $0<y<1$, and $Li_xCoPO_4$; $0<x\le1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\le1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium manganese cobalt composite oxides (e.g., $Li_xMn_yCo_{1-y}O_2$; $0<x\le1$, $0<y<1$), lithium iron phosphates (e.g., $Li_xFePO_4$; $0<x\le1$), and lithium nickel cobalt manganese composite oxides ($Li_xNi_{1-y-z}Co_yMn_zO_2$; $0<x\le1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\le x\le1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 μm or less may allow lithium ions to be smoothly diffused in solid.

The positive electrode active material may preferably have a specific surface area in the range of 0.1 $m^2$/g to 10 $m^2$/g. The positive electrode active material having a specific surface area of 0.1 $m^2$/g or more may secure an adequately large site for insertion and extraction of Li ions. The positive electrode active material having a specific surface area of 10 $m^2$/g or less may be easy to handle in industrial applications and may ensure a favorable charge-and-discharge cycle.

The binder is blended in order to fill a gap between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of CMC. One of these may be used as the binder, or a combination of two or more thereof may be used as the binder.

A conductive agent is added in order to increase the current-collecting performance and suppress the contact resistance between the positive electrode active material and the positive electrode current collector. Examples of the conductive agent include carbonaceous materials such as vapor grown carbon fibers (VGCF), carbon black such as acetylene black, graphite, carbon nanofibers and carbon nanotubes. One of these materials may be used as the conductive agent, or two or more of these materials may be combined and used as the conductive agent. In addition, the conductive agent can be omitted.

In the positive electrode active material-containing layer, it is preferable to combine the positive electrode active material and the binder in a mass ratio of the positive electrode active material in a range from 80% to 98% and the binder in a range from 2% to 20%.

By making the amount of the binder be 2% by mass or greater, sufficient electrode strength is obtained. In addition, the binder may function as an insulator. For this reason, if the amount of the binder is kept at 20% by mass or less, the amount of insulation contained in the electrode is decreased, and therefore the internal resistance can be reduced.

In the case of adding the conductive agent, it is preferable to combine the positive electrode active material, the binder, and the conductive agent in a mass ratio of the positive electrode active material in a range from 77% to 95%, the binder in a range from 2% to 20%, and conductive agent in a range from 3% to 15%.

By making the amount of the conductive agent be 3% by mass or greater, the effects described above can be exhibited. Also, by keeping the amount of the conductive agent to 15% by mass or less, the proportion of the conductive agent in contact with electrolyte can be lowered. If this proportion is low, decomposition of the electrolyte under high-temperature storage can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 μm to 20 μm, and is more preferably 15 μm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector can include a portion where the positive electrode active material-containing layer is not formed on the surface thereof. This portion can serve as a positive electrode tab.

The positive electrode can be produced, for example, by the following method. First, an active material, a conductive agent, and a binder are suspended in a solvent to prepare a slurry. This slurry is applied to one side or both sides of the current collector. Next, the applied slurry is dried to obtain a laminate of the active material-containing layer and the current collector. Thereafter, the laminate is pressed. The positive electrode is thus produced.

Alternatively, the positive electrode may be produced by the following method. First, an active material, a conductive agent, and a binder are mixed to obtain a mixture. The mixture is then formed into pellets.

Subsequently, these pellets can be arranged on the current collector to obtain a positive electrode.

(D) Separator

A separator is a sheet-type insulating material which is separate from the gel polymer layer. Examples of the separator include porous independent films such as nonwoven fabric, a porous film and paper, an organic fiber layer formed on the electrode surface such that the organic fiber layer is integral with the electrode, and a solid electrolyte layer including solid electrolyte particles. Specifically, the separator may be, for example, at least one kind selected from the group consisting of nonwoven fabric, a porous film, paper, an organic fiber layer and a solid electrolyte layer. The porous independent film and organic fiber layer which can be employed, may be the same as can be used for the above-described sheet base member. The separator may be a multilayer body in which two or more kinds of these separators are stacked. When two or more kinds of separators are stacked, a gel polymer layer may be interposed between the separators.

When the electrode group further includes the separator, the electrolyte is impregnated in the separator, and thus there is a tendency that the lithium ion conductivity between the positive and negative electrodes is improved and the input/output characteristics are excellent.

It is preferable that each of the porous independent film and the organic fiber layer has a thickness of 8 μm or more and 100 μm or less, and a density of 0.2 g/cm$^3$ or more and 0.9 g/cm$^3$ or less. If the thickness and density are within these ranges, the mechanical strength and the reduction in battery resistance can be balanced, and a secondary battery, in which a high output is achieved and internal short-circuit is suppressed, can be provided. In addition, the heat contraction of the separator in a high-temperature environment is small, and a good high-temperature storage performance can be realized. The thickness of the solid electrolyte layer is, for example, in a range of 1 μm to 50 μm, and preferably, in a range of 1 μm to 20 μm.

The solid electrolyte layer may include one type of solid electrolyte particles or may include plural types of solid electrolyte particles. The solid electrolyte layer may be a solid electrolyte composite film including solid electrolyte particles. The solid electrolyte composite film is obtained by, for example, forming solid electrolyte particles into a film shape using a polymer binder. The solid electrolyte layer may contain at least one selected from the group consisting of a plasticizer and a lithium salt. If the solid electrolyte layer includes a lithium salt, for example, the lithium ion conductivity of the solid electrolyte layer can further be increased. As the lithium salt, a lithium salt, which the above-described gel electrolyte can include, can be used.

Examples of the polymer binder included in the solid electrolyte composite film include a polyether type, a polyester type, a polyamine type, a polyethylene type, a silicone type and a polysulfide type.

As the solid electrolyte particles, an inorganic solid electrolyte is preferably used. As the inorganic solid electrolyte, for example, an oxide-based solid electrolyte or a sulfide-based solid electrolyte can be used. As the oxide-based solid electrolyte, a lithium phosphate solid electrolyte having a NASICON structure and represented by a general formula LiM$_2$(PO$_4$)$_3$ is preferably used. M in the formula is preferably at least one element selected from the group consisting of titanium (Ti), germanium (Ge), strontium (Sr), zirconium (Zr), tin (Sn), and aluminum (Al). The element M preferably includes Al and one of Ge, Zr, and Ti.

Detailed examples of the lithium phosphate solid electrolyte having the NASICON structure include LATP (Li$_{1+x}$Al$_x$Ti$_{2-x}$(PO$_4$)$_3$), Li$_{1+x}$Al$_x$Ge$_{2-x}$(PO$_4$)$_3$, and Li$_{1+x}$Al$_x$Zr$_{2-x}$(PO$_4$)$_3$. In the above formula, x falls within the range of 0<x≤5, x preferably falls within the range of 0<x≤2, x more preferably falls within the range of 0.1≤x≤0.5. As the solid electrolyte, LATP is preferably used. LATP is excellent in waterproofness and hardly causes hydrolysis in the secondary battery.

As the oxide-based solid electrolyte, use may be made of amorphous LIPON (Li$_{2.9}$PO$_{3.3}$N$_{0.46}$), or LLZ (Li$_7$La$_3$Zr$_2$O$_{12}$) having a garnet-type structure.

Next, the structure of the electrode group according to the embodiment will concretely be described with reference to the accompanying drawings.

FIG. 1 is a cross-sectional view schematically illustrating an example of the electrode group according to the embodiment. An electrode group 1 includes a negative electrode 3, a positive electrode 5, and a gel polymer layer 10 interposed between the negative electrode 3 and positive electrode 5. Only the gel polymer layer 10 is interposed between the negative electrode 3 and positive electrode 5. In FIG. 1, a Z direction is a direction in which the negative electrode 3, gel polymer layer 10 and positive electrode 5 are stacked. An X direction and a Y direction are directions which are orthogonal to the Z direction. The X direction and Y direction are orthogonal to each other, and extend along in-plane directions of a major surface of the gel polymer layer 10. FIG. 1 schematically illustrates a cross section along the Z direction of the electrode group 1.

The negative electrode 3 includes a strip-shaped negative electrode current collector 3a, and a negative electrode active material-containing layer 3b supported on both surfaces of the negative electrode current collector 3a. The negative electrode current collector 3a has, for example, a rectangular strip shape whose longitudinal direction is the Y direction. The positive electrode 5 includes a strip-shaped positive electrode current collector 5a, and a positive electrode active material-containing layer 5b supported on both surfaces of the positive electrode current collector 5a. The positive electrode current collector 5a has, for example, a rectangular strip shape whose longitudinal direction is the Y direction.

At least a part of the negative electrode 3 is opposed to the positive electrode 5. Specifically, at least a part of the negative electrode active material-containing layer 3b is opposed to the positive electrode active material-containing layer 5b. The negative electrode active material-containing layer 3b includes at least a part opposed to the positive electrode active material-containing layer 5b. FIG. 1 illustrates, by way of example, the case in which the entire surface of the negative electrode 3 (negative electrode active material-containing layer 3b) is opposed to the positive electrode 5 (positive electrode active material-containing layer 5b). Of two major surfaces which the gel polymer layer 10 has, one major surface is in contact with the negative electrode active material-containing layer 3b. Of the two major surfaces which the gel polymer layer 10 includes, the other major surface is in contact with the positive electrode active material-containing layer 5b.

As illustrated in FIG. 1, the negative electrode active material-containing layer 3b is not supported on a part of the negative electrode current collector 3a, and this part is opposed neither to the positive electrode current collector 5a nor to the positive electrode active material-containing layer 5b. This part functions as a negative electrode current-collecting tab 3c. The negative electrode current-collecting tab 3c projects from the negative electrode active material-containing layer 3b in the X direction. Similarly, the positive electrode active material-containing layer 5b is not supported on a part of the positive electrode current collector 5a, and this part is opposed neither to the negative electrode current collector 3a nor to the negative electrode active material-containing layer 3b. This part functions as a positive electrode current-collecting tab 5c. The positive electrode current-collecting tab 5c projects from the positive electrode active material-containing layer 5b in the X direction. The negative electrode current-collecting tab 3c and the positive electrode current-collecting tab 5c project in mutually opposite directions in the X direction.

The gel polymer layer 10 has, for example, a rectangular strip shape whose longitudinal direction is the Y direction. The gel polymer layer 10 is provided, for example, in the entirety of a part where the positive electrode active material-containing layer 5b and the negative electrode active material-containing layer 3b are opposed to each other. The gel polymer layer 10 may be provided in at least a portion of this part.

In FIG. 1, with respect to the X direction, the width of the gel polymer layer 10 is equal to the width of each of the negative electrode active material-containing layer 3b and positive electrode active material-containing layer 5b. It is preferable that, with respect to the X direction, the width of the gel polymer layer 10 is greater than the width of each of the negative electrode active material-containing layer 3b and positive electrode active material-containing layer 5b. In this case, there is an advantageous effect that short-circuit between the negative electrode 3 and positive electrode 5 can easily be suppressed.

Figure 2:
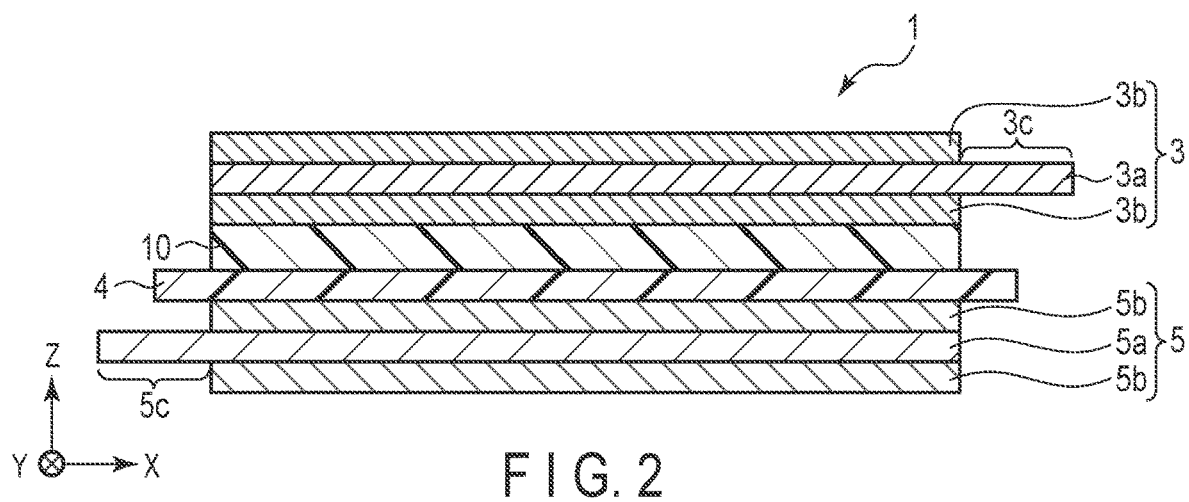
FIG. 2 is a cross-sectional view schematically illustrating another example of the electrode group according to the embodiment.

FIG. 2 is a cross-sectional view schematically illustrating another example of the electrode group according to the embodiment. An electrode group 1 illustrated in FIG. 2 has the same structure as the electrode group 1 described with reference to FIG. 1, except that the electrode group 1 of FIG. 2 further includes a porous independent film 4 serving as a separator between the positive electrode 5 and the gel polymer layer 10. Of two major surfaces which the porous independent film 4 has, one major surface is in contact with the gel polymer layer 10. Of the two major surfaces which the porous independent film 4 has, the other major surface is in contact with the positive electrode active material-containing layer 5b.

With respect to the X direction, the width of the porous independent film 4 is greater than the width of each of the negative electrode active material-containing layer 3b and the positive electrode active material-containing layer 5b. Thus, as illustrated in FIG. 2, when the porous independent film 4 is further included, there is an advantageous effect that short-circuit between the negative electrode 3 and positive electrode 5 can easily be suppressed. In addition, the porous independent film 4 can typically retain a greater amount of an electrolytic liquid than the gel polymer layer 10. The electrolytic liquid, which is in the liquid state, tends to have a better lithium ion conductivity than the gel polymer layer which is in the gel state. Accordingly, when the electrode group 1 further includes the porous independent film 4, there is a tendency that excellent input/output characteristics can be achieved.

Figure 3:
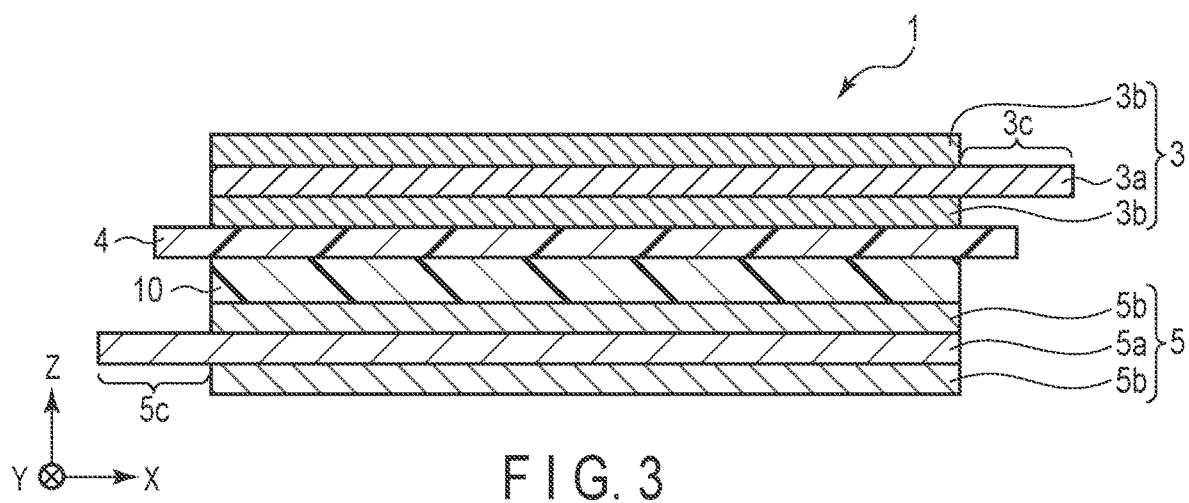
FIG. 3 is a cross-sectional view schematically illustrating another example of the electrode group according to the embodiment.

FIG. 3 is a cross-sectional view schematically illustrating another example of the electrode group according to the embodiment. An electrode group 1 illustrated in FIG. 3 has the same structure as the electrode group 1 described with reference to FIG. 2, except that, the electrode group 1 of FIG. 3 further includes a porous independent film 4 serving as a separator between the negative electrode 3 and the gel polymer layer 10. Of two major surfaces which the porous independent film 4 has, one major surface is in contact with the gel polymer layer 10. Of the two major surfaces which the porous independent film 4 has, the other major surface is in contact with the negative electrode active material-containing layer 3b.

Figure 4:
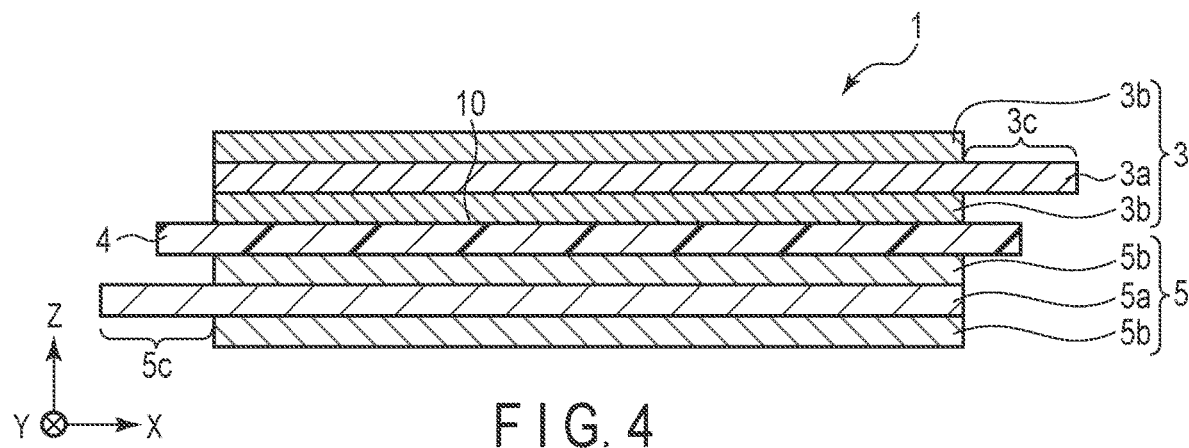
FIG. 4 is a cross-sectional view schematically illustrating another example of the electrode group according to the embodiment.

FIG. 4 is a cross-sectional view schematically illustrating another example of the electrode group according to the embodiment. In an electrode group 1 illustrated in FIG. 4, the gel electrolyte is impregnated in the negative electrode 3 (negative electrode active material-containing layer 3b). Therefore, the gel electrolyte serving as the gel polymer layer 10 is present on the surface of the negative electrode 3. In other words, the gel electrolyte serving as the gel polymer layer 10 is present between the negative electrode 3 and the positive electrode 5. The electrode group 1 further includes a porous independent film 4 between the negative electrode 3 and positive electrode 5. According to the mode of FIG. 4, the gel polymer layer 10 suppresses the proton motion between the positive and negative electrodes, and the volume occupied by the gel polymer layer 10 in the electrode group can be decreased. Therefore, the volume occupied by the active material-containing layers of the positive and negative electrodes can be increased, and as a result the volume energy density of the battery can be improved.

Figure 5:
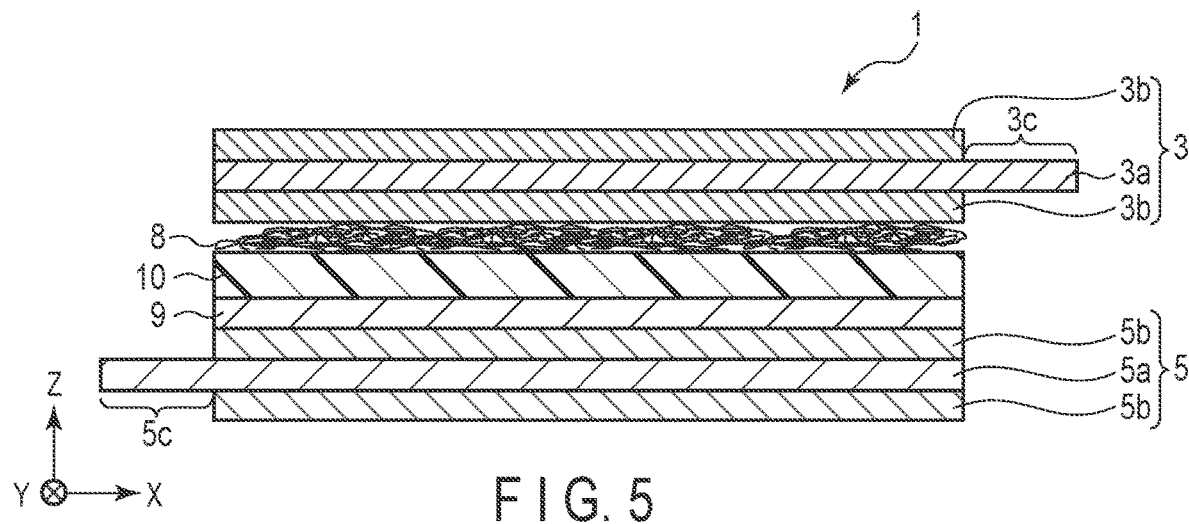
FIG. 5 is a cross-sectional view schematically illustrating another example of the electrode group according to the embodiment.

FIG. 5 is a cross-sectional view schematically illustrating another example of the electrode group according to the embodiment. An electrode group 1 illustrated in FIG. 5 has the same structure as the electrode group 1 described with reference to FIG. 1, except that the electrode group 1 of FIG. 5 includes an organic fiber layer 8 serving as a separator between the negative electrode 3 and the gel polymer layer 10, and includes a solid electrolyte layer 9 serving as a separator between the positive electrode 5 and the gel polymer layer 10.

The organic fiber layer 8 is stacked on the negative electrode active material-containing layer 3b in the state in which at least a part of the organic fiber layer 8 is melt-bonded to the negative electrode active material-containing layer 3b. That major surface of the organic fiber layer 8, which is not in contact with the negative electrode active material-containing layer 3b, is in contact with the gel polymer layer 10. Of two major surfaces which the solid electrolyte layer 9 has, one major surface is in contact with the positive electrode active material-containing layer 5b, and the other major surface is in contact with the gel polymer layer 10.

In the mode relating to FIG. 5, the solid electrolyte layer 9 and organic fiber layer 8, which serve as separators, are present. Thus, even if peeling or the like occurs in a part of the solid electrolyte layer 9, the organic fiber layer 8 can suppress short-circuit between the positive and negative electrodes. Since the organic fiber layer 8 has a very small thickness and a low density, the organic fiber layer 8 has an excellent impregnation property of the electrolytic liquid. In addition, since the gel polymer layer 10 is interposed between the solid electrolyte layer 9 and the organic fiber layer 8, short-circuit is less likely occur, and it is possible to obtain an advantageous effect that the proton motion between the positive and negative electrodes can be suppressed. The gel polymer layer 10 may be interposed, not between the solid electrolyte layer 9 and the organic fiber layer 8, but between the solid electrolyte layer 9 and the positive electrode active material-containing layer 5b. The organic fiber layer 8 or the solid electrolyte layer 9 may be omitted.

The electrode group according to the first embodiment includes a positive electrode, a negative electrode, and a gel polymer layer interposed between the positive electrode and the negative electrode. At least a part of the negative electrode is opposed to the positive electrode. The gel polymer layer is formed of a gel electrolyte composed of a polymer material, an organic solvent and a lithium salt, and a sheet base member which supports the gel electrolyte, or the gel polymer layer is formed of only the gel electrolyte. Since the gel polymer layer can suppress the proton motion between the positive and negative electrode, the electrode group according to the first embodiment can realize a secondary battery which exhibits excellent input/output characteristics and cycle life characteristics.

Second Embodiment

According to a second embodiment, there is provided a secondary battery including the electrode group according to the first embodiment, and an electrolyte. The secondary battery may be, for example, a lithium ion secondary battery. The secondary battery may be a nonaqueous electrolyte secondary battery including a nonaqueous electrolyte.

The secondary battery can further include a container member which stores the electrode group and electrolyte. The electrolyte can be held in the electrode group. The electrolyte can be held, for example, by the negative electrode active material-containing layer, the positive electrode active material-containing layer, and the separator, and between these layers.

The secondary battery can further include a negative electrode terminal electrically connected to the negative electrode, and a positive electrode terminal electrically connected to the positive electrode.

Hereinafter, the negative electrode, positive electrode, separator, electrolyte, container member, negative electrode terminal and positive electrode terminal will be described in detail.

(1) Negative Electrode

The negative electrode, which the secondary battery according to the second embodiment includes, may be, for example, the negative electrode described in the first embodiment.

(2) Positive Electrode

The positive electrode, which the secondary battery according to the second embodiment includes, may be, for example, the positive electrode described in the first embodiment.

(3) Separator

The separator, which the secondary battery according to the second embodiment includes, may be, for example, the separator described in the first embodiment.

(4) Electrolyte

The electrolyte, which the secondary battery includes, is, for example, a liquid-state nonaqueous electrolyte. The liquid-state nonaqueous electrolyte is prepared by dissolving an electrolyte salt serving as a solute in an organic solvent. The concentration of the electrolyte salt is, preferably, 0.5 mol/L or more and 3 mol/L or less. As the organic solvent, the same organic solvent as included in the gel electrolyte according to the first embodiment can be used. As the electrolyte salt, the same lithium salt as included in the gel electrolyte according to the first embodiment can be used.

Alternatively, as the electrolyte salt, a normal-temperature molten salt (ionic melt) containing lithium ions can be used. The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be described in detail with reference to the drawings.

Figure 6:
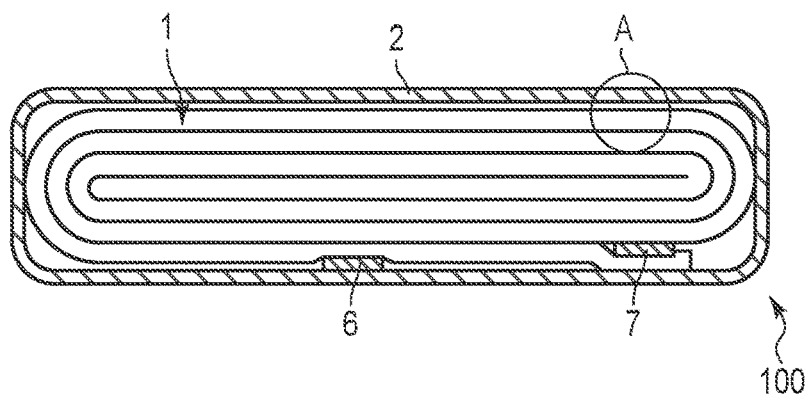
FIG. 6 is a cross-sectional view schematically illustrating an example of a secondary battery according to another embodiment.
Figure 7:
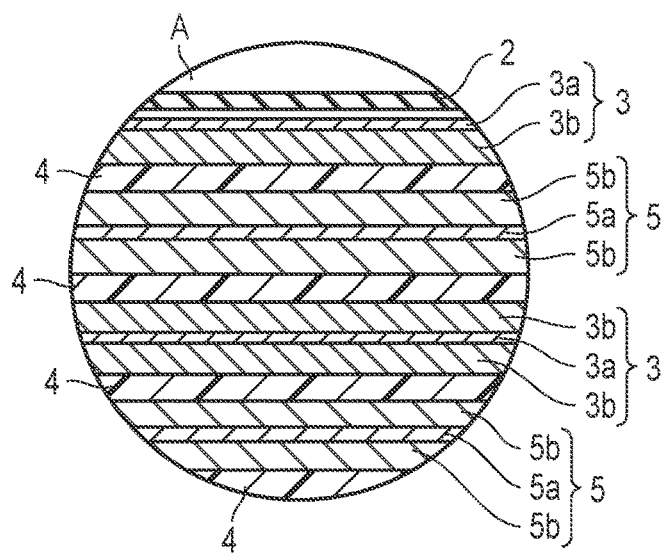
FIG. 7 is an enlarged cross-sectional view of a part A of the secondary battery illustrated in FIG. 6.

FIG. 6 is a sectional view schematically showing one example of a secondary battery according to an embodiment. FIG. 7 is an enlarged sectional view of a portion A of the secondary battery shown in FIG. 6.

The secondary battery 100 shown in FIG. 6 and FIG. 7 includes a bag-shaped container member 2 shown in FIG. 6, an electrode group 1 shown in FIG. 6 and FIG. 7, and an electrolyte (not shown). The electrode group 1 and the electrolyte are stored in the bag-shaped container member 2. The electrolyte (not shown) is held in the electrode group 1.

The bag-shaped container member 2 is formed from a laminate film including two resin layers and a metal layer disposed therebetween.

As illustrated in FIG. 6, the electrode group 1 is a flat-shaped wound electrode group. As illustrated in FIG. 7, the flat-shaped wound electrode group 1 includes the negative electrode 3, the porous independent film 4 serving as a separator, and the positive electrode 5. The porous independent film 4 is interposed between the negative electrode 3 and the positive electrode 5. A gel electrolyte is impregnated in the negative electrode active material-containing layer 3b. As described with reference to FIG. 2 and FIG. 3, the gel polymer layer 10 serving as the independent film may be interposed between the negative electrode 3 and the porous independent film 4, and/or between the positive electrode 5 and the porous independent film 4.

A negative electrode 3 includes a negative electrode current collector 3a and negative electrode active material-containing layers 3b. In the portion of the negative electrode 3 located at the outermost shell of a wound electrode group 1, the negative electrode active material-containing layer 3b is formed only on the inside surface side of the negative electrode current collector 3a, as shown in FIG. 7. In another portion of the negative electrode 3, the negative electrode active material-containing layer 3b is formed on both sides of the negative electrode current collector 3a.

A positive electrode 5 includes a positive electrode current collector 5a and a positive electrode active material-containing layer 5b formed on both sides thereof.

As shown in FIG. 6, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the opening of the bag-shaped container member 2 are closed by thermal fusion bonding of the thermoplastic resin layer.

Figure 8:
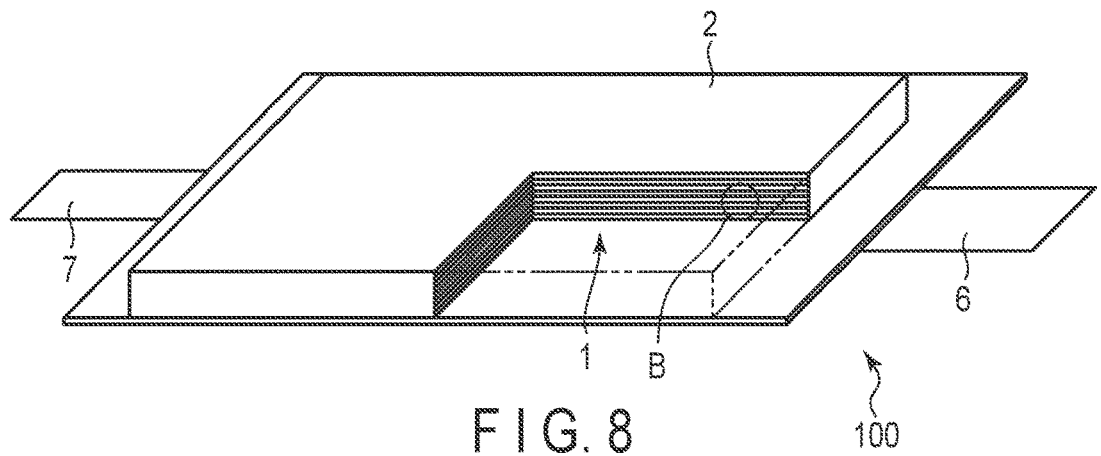
FIG. 8 is a partially cut-out perspective view schematically illustrating another example of the secondary battery according to the embodiment.
Figure 9:
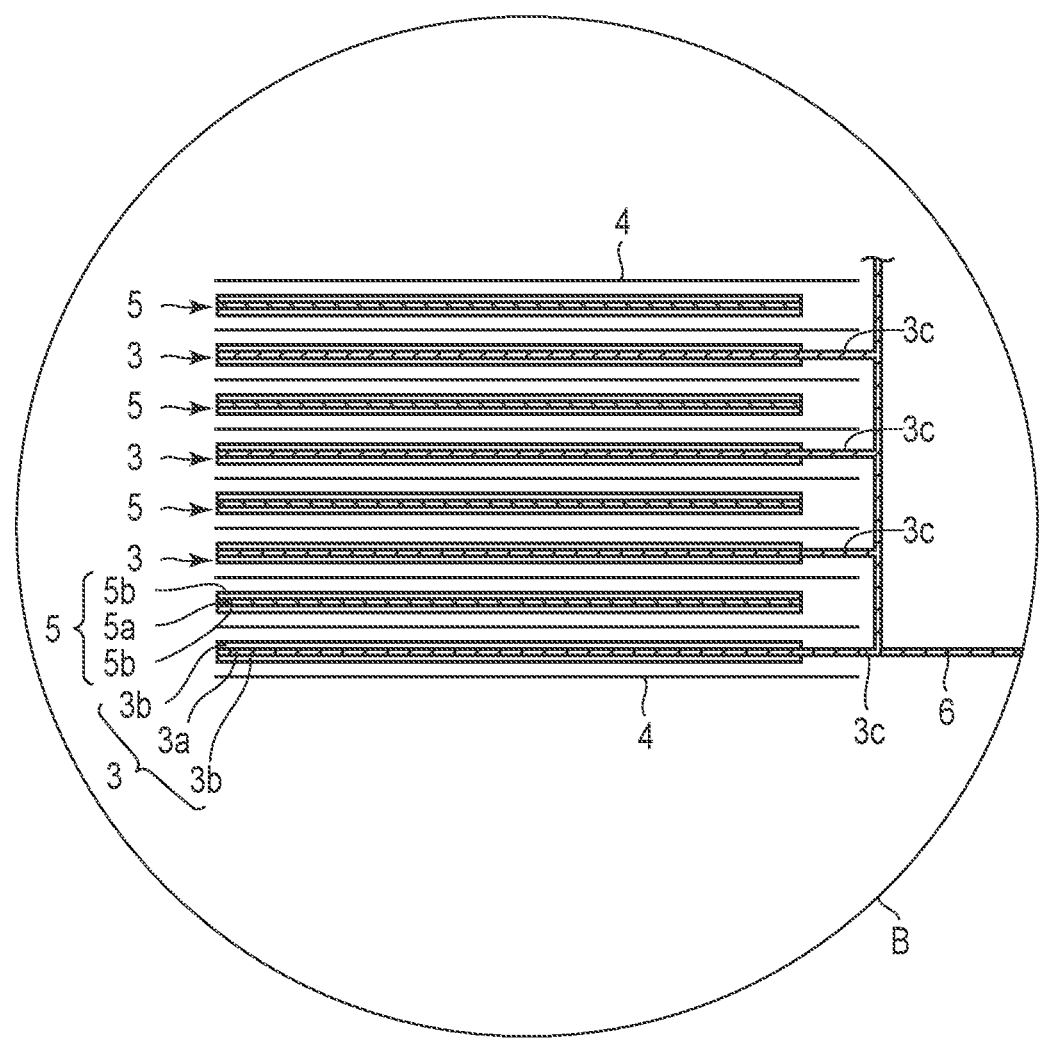
FIG. 9 is an enlarged cross-sectional view of a part B of the secondary battery illustrated in FIG. 8.

The secondary battery according to the embodiment is not limited to the secondary battery having the structure shown in FIGS. 6 and 7, and may be, for example, a battery having a structure shown in FIGS. 8 and 9.

FIG. 8 is a partial cut-away sectional perspective view schematically showing another example of the secondary battery according to the embodiment. FIG. 9 is an enlarged sectional view of a portion B of the secondary battery shown in FIG. 8.

The secondary battery 100 shown in FIGS. 8 and 9 includes an electrode group 1 shown in FIGS. 8 and 9, a container member 2 shown in FIG. 8, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 9, the electrode group 1 is a laminated electrode group. The laminated electrode group 1 has a structure in which a negative electrode 3 and a positive electrode 5 are alternately laminated with a porous independent film 4 intervening therebetween.

The electrode group 1 includes a plurality of the negative electrodes 3. The plurality of negative electrodes 3 are each provided with a negative electrode current collector 3a and a negative electrode active material-containing layer 3b carried on both sides of the negative electrode current collector 3a. A gel electrolyte is impregnated in the negative electrode active material-containing layer 3b. Further, the electrode group 1 includes a plurality of the positive electrodes 5. The plurality of positive electrodes 5 are each provided with a positive electrode current collector 5a and a positive electrode active material-containing layer 5b carried on both sides of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode tab. As shown in FIG. 9, the portion 3c acting as the negative electrode tab does not overlap the positive electrode 5. In addition, a plurality of negative electrode tabs (portion 3c) is electrically connected to a belt-shaped negative electrode terminal 6. A tip of the belt-shaped negative electrode terminal 6 is drawn outward from a container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to a belt-shaped positive electrode terminal 7. A tip of the belt-shaped positive electrode terminal 7 is positioned on the opposite side to the negative electrode terminal 6 and is drawn outward from the container member 2.

The secondary battery according to the second embodiment includes the electrode group according to the first embodiment. Thus, the secondary battery according to the second embodiment can achieve excellent input/output characteristics and cycle life characteristics.

Third Embodiment

According to the third embodiment, a battery module is provided. The battery module according to the third embodiment is equipped with a plurality of the secondary batteries according to the second embodiment.

In the battery module according to the embodiment, individual unit cells may be electrically connected in series or in parallel, or may be arranged in combination of series connection and parallel connection.

Next, an example of the battery module according to the embodiment will be described with reference to the drawings.

Figure 10:
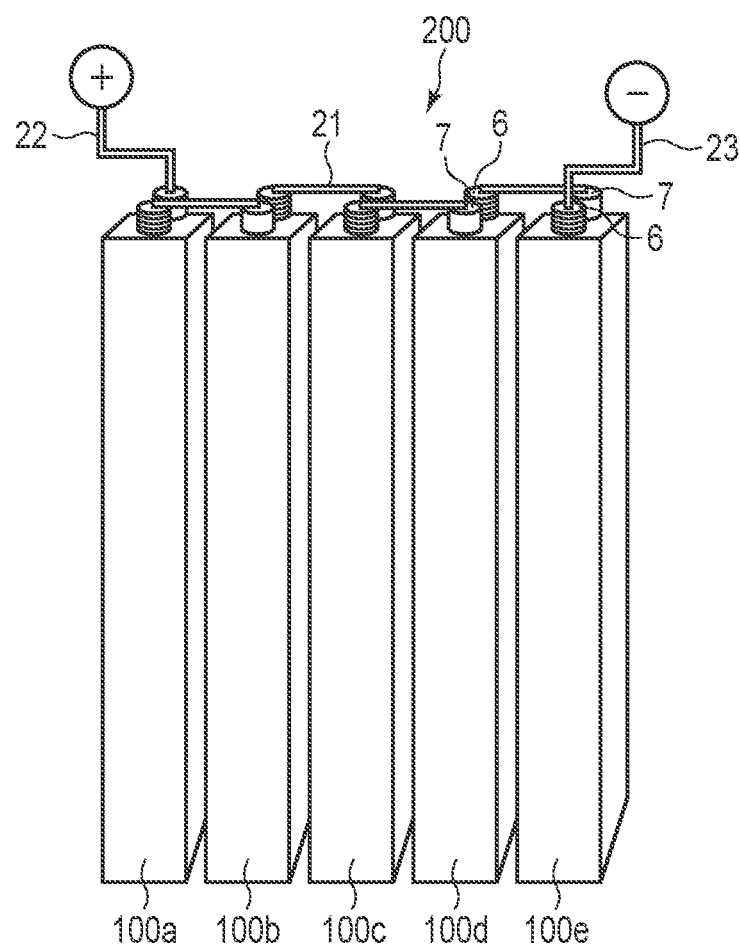
FIG. 10 is a perspective view schematically illustrating an example of a battery module according another embodiment.

FIG. 10 is a perspective view schematically showing an example of the battery module according to the embodiment. The battery module 200 shown in FIG. 10 includes five unit cells 100a to 100e, four bus bars 21, a positive electrode-side lead 22, and a negative electrode-side lead 23. Each of the five unit cells 100a to 100e is the secondary battery according to the second embodiment.

The busbar 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 10 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

The battery module according to the third embodiment includes the secondary battery according to the second embodiment. Accordingly, the battery module according to the third embodiment can achieve excellent input/output characteristics and cycle life characteristics.

Fourth Embodiment

According to the fourth embodiment, a battery pack is provided. The battery pack includes the battery module according to the third embodiment. The battery pack may also be equipped with a single secondary battery according to the second embodiment instead of the battery module according to the third embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 11:
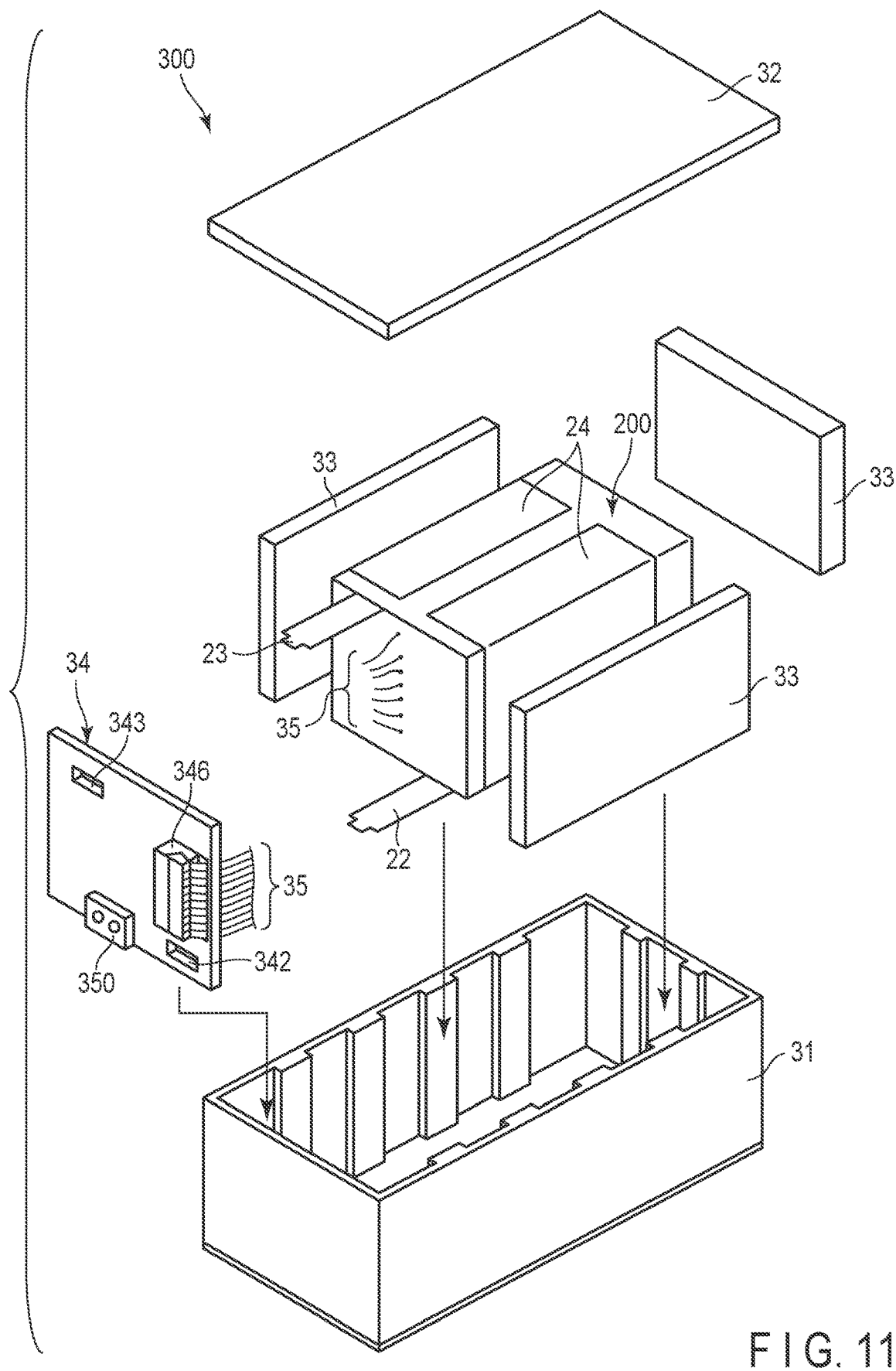
FIG. 11 is an exploded perspective view schematically illustrating an example of a battery pack according to another embodiment.
Figure 12:
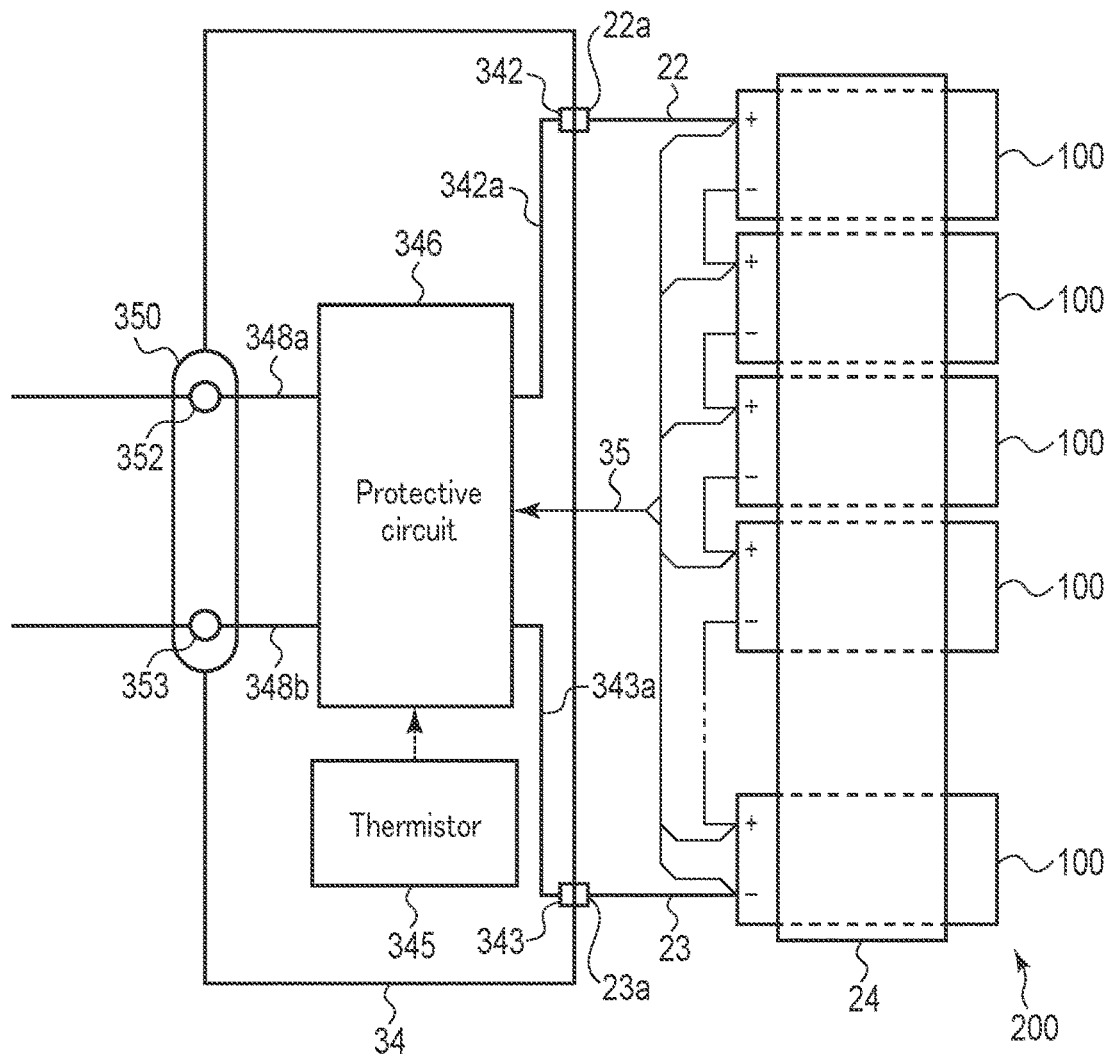
FIG. 12 is a block diagram illustrating an example of an electric circuit of the battery pack illustrated in FIG. 11.

FIG. 11 is an exploded perspective view schematically showing an example of the battery pack according to the embodiment. FIG. 12 is a block diagram showing an example of an electric circuit of the battery pack shown in FIG. 11.

A battery pack 300 shown in FIGS. 11 and 12 includes a housing container 31, a lid 32, protective sheets 33, a battery module 200, a printed wiring board 34, wires 35, and an insulating plate (not shown).

A housing container 31 shown in FIG. 11 is a bottomed-square-shaped container having a rectangular bottom surface.

The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 12. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342.

The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343a. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell (s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment includes the secondary battery according to the second embodiment or the battery module according to the third embodiment. Thus, according to the fourth embodiment, there can be provided the battery pack including the secondary battery or battery module which can achieve excellent input/output characteristics and cycle life characteristics.

Fifth Embodiment

According to the fifth embodiment, a vehicle is provided. The vehicle includes the battery pack according to the fourth embodiment.

In a vehicle according to the fifth embodiment, the battery pack is configured, for example, to recover regenerative energy from motive force of the vehicle. The vehicle may include a mechanism configured to convert kinetic energy of the vehicle into regenerative energy.

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

A plurality of battery packs is loaded on the vehicle according to the fifth embodiment. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fifth embodiment will be described with reference to the drawings.

Figure 13:
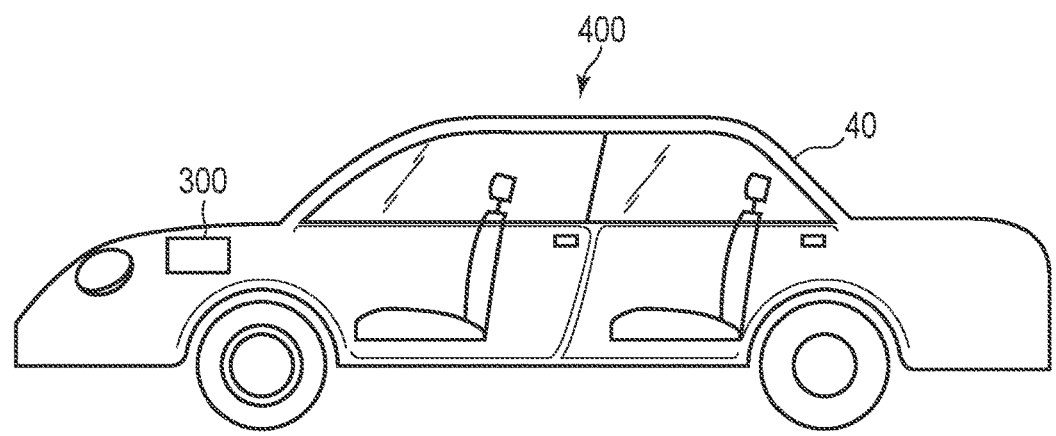
FIG. 13 is a partially transparent view schematically illustrating an example of a vehicle according to another embodiment.

FIG. 13 is a partially transparent diagram schematically illustrating one example of a vehicle according to the embodiment.

A vehicle 400 illustrated in FIG. 13 includes a vehicle body 40 and a battery pack 300 according to the embodiment. In the example illustrated in FIG. 13, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 13, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fifth embodiment will be described with reference to FIG. 14.

Figure 14:
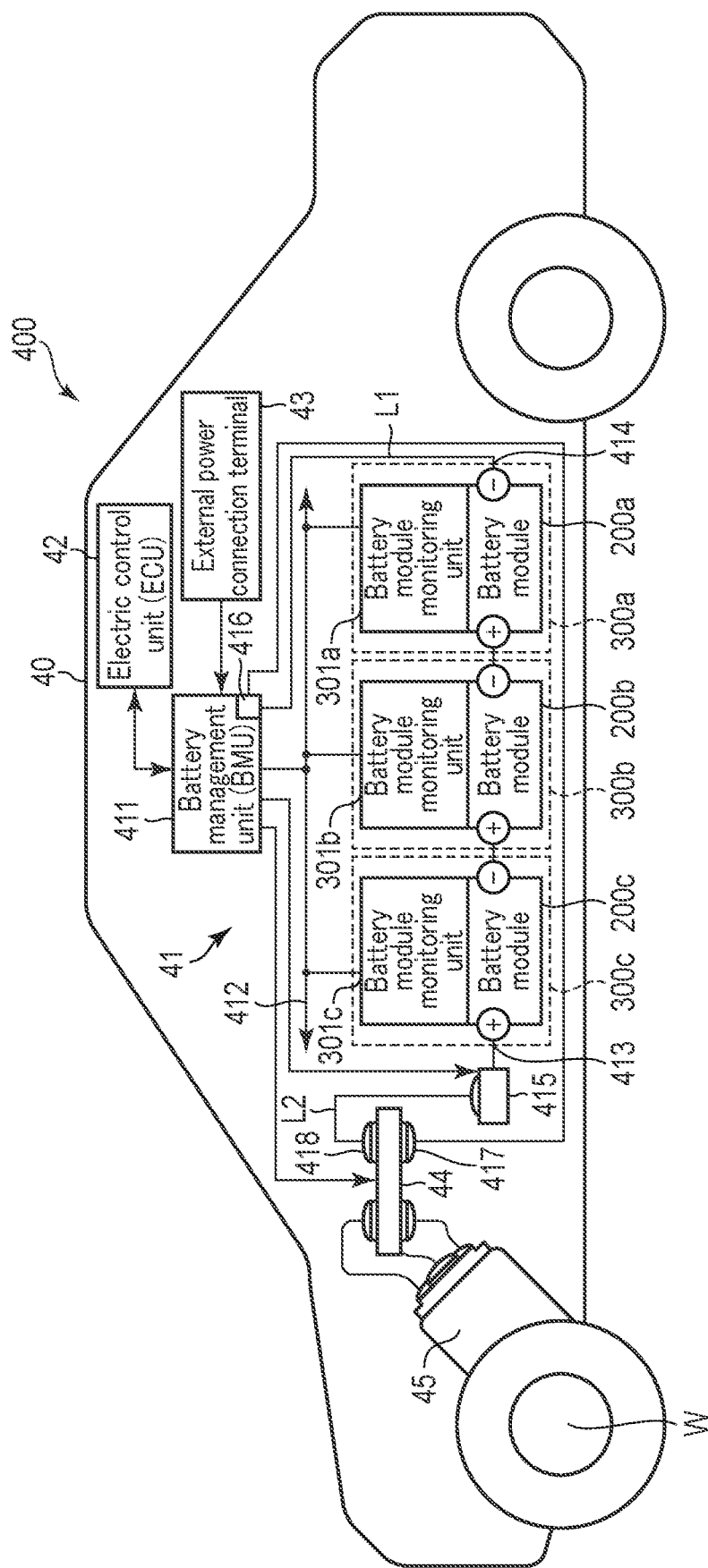
FIG. 14 is a view schematically illustrating an example of a control system relating to an electrical system in the vehicle according to the embodiment.

FIG. 14 is a diagram schematically illustrating one example of a control system related to an electrical system in the vehicle according to the fifth embodiment. The vehicle 400 illustrated in FIG. 14 is an electric automobile.

The vehicle 400, shown in FIG. 14, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 14, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 14) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 415 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the fifth embodiment includes the battery pack according to the fourth embodiment. Thus, according to the fifth embodiment, there can be provided the vehicle including the battery pack which can achieve excellent input/output characteristics and cycle life characteristics.

EXAMPLES

Examples will be described below. The embodiments are not limited to the Examples described below.

Example 1

<Fabrication of Positive Electrode>
A positive electrode was fabricated as follows.

To begin with, a positive electrode active material, a conductive agent and a binder were dispersed in a solvent, and thus a slurry was prepared. The ratio between the positive electrode active material, the conductive agent and the binder was 93 mass %:5 mass %:2 mass %. As the positive electrode active material, lithium nickel cobalt manganese composite oxide ($LiNi_{0.5}Co_{0.2}Mn_{0.3}O_2$) powder with a secondary particle size of 6 μm was used. As the conductive agent, a mixture of acetylene black and carbon black was used. The mass ratio between the acetylene black and the carbon black in the mixture was 2:1. As the binder, polyvinylidene fluoride (PVdF) was used. As the solvent, N-methylpyrrolidone (NMP) was used.

Next, the prepared slurry was coated on both surfaces of the positive electrode current collector, and the coating films were dried, and thus the positive electrode active material-containing layer was formed. As the positive electrode current collector, an aluminum alloy foil with a thickness of 12 μm was used. Subsequently, the positive electrode current collector and the positive electrode active material-containing layer were pressed, and the positive electrode was fabricated, <Fabrication of Negative Electrode>
A negative electrode was fabricated as follows.

To begin with, a negative electrode active material, a conductive agent and a binder were dispersed in a solvent, and thus a slurry was prepared. The ratio between the negative electrode active material, the conductive agent and the binder was 95 mass %:3 mass %:2 mass %. As the negative electrode active material, niobium titanium composite oxide ($Nb_2TiO_7$) powder with a secondary particle size of 4 μm was used. The lithium ion insertion/extraction potential of the niobium titanium oxide was 1.3 V (vs. $Li/Li^+$) or more and 1.5 V (vs. $Li/Li^+$) or less. As the conductive agent, a mixture of acetylene black and carbon black was used. The mass ratio between the acetylene black and the carbon black in the mixture was 2:1. As the binder, SBR was used. As the solvent, pure water was used.

Next, the prepared slurry was coated on both surfaces of the negative electrode current collector, and the coating films were dried, and thus the negative electrode active material-containing layer was formed. As the negative electrode current collector, an aluminum alloy foil with a thickness of 12 μm was used. Then, the negative electrode current collector and the negative electrode active material-containing layer were pressed, and the negative electrode was obtained.

<Preparation of Nonaqueous Electrolyte>
An electrolyte salt was dissolved in an organic solvent, and a liquid-state nonaqueous electrolyte was prepared. As the electrolyte salt, $LiPF_6$ was used. The molar concentration of $LiPF_6$ in the nonaqueous electrolyte was set at 1.5 mol/L. As the organic solvent, a mixed solvent of propylene carbonate (PC) and diethyl carbonate (DEC) was used. The volume ratio between PC and DEC was 1:2.

<Fabrication of Gel Polymer Layer>
In an Ar box, a post-polymer solution was added to the previously prepared liquid-state nonaqueous electrolyte, and a mixture liquid for forming a gel polymer layer was obtained. As the post-polymer, methyl methacrylate was used. The concentration of the post-polymer in the mixture liquid was set at 2 mass %. Then, a polypropylene porous film with a thickness of 29 μm was prepared as a sheet base member. The prepared sheet base member was immersed in the mixture liquid, and the mixture liquid was impregnated in the inside of the sheet base member at a reduced pressure. The sheet base member impregnated with the mixture liquid was taken out, and was heated at 60° C. for 24 hours, and thereby the liquid-state nonaqueous electrolyte was gelled. In this manner, a gel polymer layer serving as an independent film, which has ion conductivity, was obtained. The thickness of the obtained gel polymer layer was 30 μm. Since the methyl methacrylate was used as the post-polymer, the polymer that the gel electrolyte includes was polymethyl methacrylate (PMMA).

<Manufacture of Secondary Battery>
In a globe box of an Ar atmosphere, the positive electrode, gel polymer layer and negative electrode were stacked in the named order, and a flat-shaped stacked electrode group was obtained. The obtained electrode group was stored in a thin-type metallic can. Then, the previously prepared liquid-state nonaqueous electrolyte was poured in the metallic can, and thus the secondary battery was manufactured.

Example 2

A secondary battery was manufactured by the same method as in Example 1, except that as the gel polymer layer, a gel polymer layer fabricated as described below was used.

To start with, a mixture liquid for forming a gel polymer layer was prepared by the same method as in Example 1. The mixture liquid was spread over a release surface of release paper, the release surface of which was coated with a silicon-based release agent, and the mixture liquid was heated at 60° C. for 24 hours, and thereby the liquid-state nonaqueous electrolyte was gelled. Thereafter, the gel polymer layer (gel polymer sheet) was peeled from the release paper.

Example 3

A secondary battery was manufactured by the same method as in Example 1, except that the positive electrode, separator, gel polymer layer and negative electrode were stacked in the named order when the secondary battery was manufactured. However, since the thickness of the sheet base member was changed to 14 μm, the thickness of the obtained gel polymer layer was 15 μm. The thus obtained electrode group had the mode illustrated in FIG. 2. Specifically, the gel polymer layer was located more on the negative electrode side than the separator. The separator employed was nonwoven fabric formed of cellulose with a thickness of 12 μm.

Example 4

To start with, a negative electrode (negative electrode active material-containing layer) fabricated by the same method as in Example 1 was immersed in the mixture liquid prepared by the same method as in Example 1, and the mixture liquid was impregnated in the inside of the negative electrode active material-containing layer at a reduced pressure. The negative electrode was taken out, and heated at 60° C. for 24 hours, and thereby the liquid-state nonaqueous electrolyte was gelled. In this manner, the negative electrode impregnated with the gel polymer layer was obtained. The negative electrode active material-containing layer impregnated with the gel polymer layer was supported on both surfaces of the obtained negative electrode. The thickness of the gel polymer layer was 0.5 μm.

Next, in a globe box of an Ar atmosphere, the positive electrode, separator and negative electrode, which were fabricated by the same method as in Example 1, were stacked in the named order, and a flat-shaped stacked electrode group was obtained. The obtained electrode group had the mode illustrated in FIG. 4. Thereafter, the obtained electrode group was stored in a thin-type metallic can. Then, the liquid-state nonaqueous electrolyte, which was prepared by the same method as in Example 1, was poured in the metallic can, and thus the secondary battery was manufactured.

Example 5

A secondary battery was manufactured by the same method as in Example 3, except that the positive electrode, gel polymer layer, separator and negative electrode were stacked in the named order when the secondary battery was manufactured. The thus obtained electrode group had the mode illustrated in FIG. 3. Specifically, the gel polymer layer was located more on the positive electrode side than the separator.

Example 6

A secondary battery was manufactured by the same method as in Example 4, except that the gel polymer layer was supported on the positive electrode, and the gel polymer layer was not supported on the negative electrode.

Example 7

A positive electrode and a negative electrode were fabricated by the same method as in Example 1. Then, a gel polymer layer was fabricated by the same method as in Example 3, except that the concentration of the gel polymer in the mixture liquid was changed to 5 mass %. One more gel polymer layer, which is the same as this gel polymer layer, was fabricated, and two gel polymer layers in total were formed.

Next, in a globe box of an Ar atmosphere, the positive electrode, gel polymer layer, separator, gel polymer layer and negative electrode were stacked in the named order, and a flat-shaped stacked electrode group was obtained. The obtained electrode group was stored in a thin-type metallic can. Then, the liquid-state nonaqueous electrolyte, which was prepared by the same method as in Example 1, was poured in the metallic can, and thus the secondary battery was manufactured. The separator employed was the same as the separator used in Example 3.

Example 8

To begin with, a negative electrode was fabricated by the same method as in Example 4, except that the concentration of the post-polymer in the mixture liquid for forming the gel polymer layer was changed to 5 mass %. Next, a positive electrode was fabricated by the same method as in Example 6, except that the concentration of the post-polymer in the mixture liquid was changed to 5 mass %.

Then, in a globe box of an Ar atmosphere, the positive electrode, separator and negative electrode were stacked in the named order, and a flat-shaped stacked electrode group was obtained. The obtained electrode group was stored in a thin-type metallic can. Then, the liquid-state nonaqueous electrolyte, which was prepared by the same method as in Example 1, was poured in the metallic can, and thus the secondary battery was manufactured. The separator employed was the same as the separator used in Example 3.

Example 9

<Fabrication of Negative Electrode>

By the same method as in Example 4, a negative electrode, on both surfaces of which the negative electrode active material-containing layer impregnated with the gel polymer layer is supported, was obtained. On the negative electrode active material-containing layer of one surface, organic fibers were stacked by electrospinning, and thus an organic fiber layer was formed. As a raw material solution for use in the electrospinning, use was made of an N-methyl-2-pyrrolidone (NMP) containing polyamide-imide at a concentration of 20 mass %. The thickness of the formed organic fiber layer was 6 μm.

<Fabrication of Positive Electrode>

After the positive electrode was fabricated by the same method as in Example 1, a solid electrolyte layer was formed on the positive electrode active material-containing layer of one surface, as described below. A slurry, in which LATP ($Li_2O—Al_2O_3—SiO_2—P_2O_5—TiO_2$) powder serving as a solid electrolyte and PVdF serving as a polymer material are dispersed in NMP at a mass ratio of 30:2, was coated on the positive electrode active material-containing layer of one surface. Then, the coating film was dried, and a multilayer body was obtained. Further, the multilayer body was subjected to normal-temperature press, and a positive electrode, in which the solid electrolyte layer is stacked on the positive electrode active material-containing layer of one surface, was fabricated.

<Manufacture of Secondary Battery>

In a globe box of an Ar atmosphere, the positive electrode and the negative electrode are stacked such that the organic fiber layer and the solid electrolyte layer face each other, and a flat-shaped stacked electrode group was obtained. The obtained electrode group was stored in a thin-type metallic can. Then, the liquid-state nonaqueous electrolyte, which was prepared by the same method as in Example 1, was poured in the metallic can, and thus the secondary battery was manufactured.

Example 10

To begin with, after a negative electrode was fabricated by the same method as in Example 1, an organic fiber layer was formed on one surface of the negative electrode by the same method as in Example 9. Then, after a positive electrode was fabricated by the same method as in Example 1, a solid electrolyte layer was formed on one surface of the positive electrode by the same method as in Example 9. However, as the solid electrolyte, LZCP ($Li_{1.2}Zr_{1.9}Ca_{0.1}(PO_4)_3$) powder was used.

The thus obtained negative electrode and positive electrode were stacked in the globe box of the Ar atmosphere, such that the organic fiber layer and the solid electrolyte layer face each other, and a flat-shaped stacked electrode group was obtained. The obtained electrode group was stored in a thin-type metallic can. Then, the liquid-state nonaqueous electrolyte, which was prepared by the same method as in Example 1, was poured in the metallic can, and thus the secondary battery was manufactured.

Example 11

A secondary battery was manufactured as in Example 4, except that vinylidene fluoride was used as the post-polymer in the mixture liquid for forming the gel polymer layer, with the concentration of the vinylidene fluoride being set at 0.5 mass %, and that nonwoven fabric formed of polyethylene with a thickness of 15 µm was used as the separator.

Example 12

A secondary battery was fabricated as in Example 4, except that vinylidene fluoride was used as the post-polymer in the mixture liquid for forming the gel polymer layer, with the concentration of the vinylidene fluoride being set at 10 mass %, and that nonwoven fabric formed of polypropylene with a thickness of 12 µm was used as the separator.

Example 13

A secondary battery was fabricated by the same method as in Example 4, except that the concentration of the methyl methacrylate in the mixture liquid for forming the gel polymer layer was set at 3 mass %, and the thickness of the gel polymer layer was changed to 0.1 µm.

Example 14

A secondary battery was fabricated by the same method as in Example 3, except that the thickness of the gel polymer layer was changed to 300 µm.

Example 15

A secondary battery was fabricated by the same method as in Example 4, except that acrylonitrile was used as the post-polymer in the mixture liquid for forming the gel polymer layer, with the concentration of the acrylonitrile being set at 5 mass %. The polymer, which the gel electrolyte includes, was polyacrylonitrile (PAN).

Example 16

A secondary battery was fabricated by the same method as in Example 4, except that ethylene oxide was used as the post-polymer in the mixture liquid for forming the gel polymer layer, with the concentration of the ethylene oxide being set at 5 mass %. The polymer, which the gel electrolyte includes, was polyethylene oxide (PEO).

Example 17

A secondary battery was fabricated by the same method as in Example 4, except that a lithium titanium composite oxide ($Li_4Ti_5O_{12}$) with an average particle size $D_{50}$ of 1 µm was used as the negative electrode active material.

Example 18

A secondary battery was fabricated by the same method as in Example 4, except that an orthorhombic Na-containing niobium titanium composite oxide ($Li_{2.2}Na_{1.7}Ti_{5.7}Nb_{0.3}O_{14}$) with an average particle size $D_{50}$ of 5 µm was used as the negative electrode active material.

Example 19

A secondary battery was fabricated by the same method as in Example 4, except that bronze-type titanium oxide ($TiO_2$ (B)) was used as the negative electrode active material.

Comparative Example 1

A secondary battery was fabricated by the same method as in Example 3, except that the formation of the gel polymer layer was omitted.

Comparative Example 2

A secondary battery was fabricated by the same method as in Example 3, except that the gel polymer layer included, as inorganic particles, LZCP ($Li_{1.2}Zr_{1.9}Ca_{0.1}(PO_4)_3$) powder that is a solid electrolyte. Specifically, as the mixture liquid for forming the gel polymer layer, use was made of a mixture liquid further including the above-described solid electrolyte particles at a concentration of 5 mass %.

Comparative Example 3

A secondary battery was fabricated by the same method as in Example 3, except that the gel polymer layer included alumina ($Al_2O_3$) as inorganic particles, and the thickness of the gel polymer layer was changed to 10 µm. Specifically, a mixture liquid further including alumina at a concentration of 5 mass % was used as the mixture liquid for forming the gel polymer layer.

<Rate Characteristics>

With respect to the secondary batteries manufactured in the respective Examples, the rate characteristics were measured by the following method.

Specifically, to begin with, constant-current charging was performed for the secondary battery at a rate of 1 C, until the SOC reached 100%. Thereafter, constant-voltage charging was performed until the rate reached 1/20 C. Then, the secondary battery was discharged at a rate of 3 C until the SOC reached 0%. The discharge capacity at this time was set as a 3 C discharge capacity. Subsequently, this secondary battery was charged once again at the rate of 1 C until the SOC reached 100%. Thereafter, constant-voltage charging was performed until the rate reaches 1/20 C. Then, the secondary battery was discharged at a rate of 0.2 C until the SOC reached 0%. The discharge capacity at this time was set as a 0.2 C discharge capacity. By dividing the 3 C discharge capacity by the 0.2 C discharge capacity, the capacity ratio, i.e., 3 C discharge capacity/0.2 C discharge capacity, was calculated.

<45° C. Cycle Life Evaluation>

In an environment at 45° C., a cycle of charging the secondary battery until the SOC reaches 100% with a constant current of 4 A (4 C) and then discharging the secondary battery until the SOC reaches 0% with 4 A (4 C) was repeated, and the number of cycles at a time when the capacity reached 80% relative to the initial capacity was set as a cycle life (number).

The obtained results are summarized in Table 1 below. In Table 1, the column of "Post-polymer content" indicates the post-polymer content in the mixture liquid for forming the gel polymer layer, which was used in the formation of the gel polymer layer. As regards "Position" in the column of "Gel polymer layer", the description "Negative electrode side" or "Positive electrode side" indicates that the gel polymer layer was present on the negative electrode side or positive electrode side with reference to the separator, or on both sides. In addition, the description "Negative electrode" or "Positive electrode" indicates that the gel polymer layer (gel electrolyte) was impregnated in the positive electrode or the negative electrode, or in both the positive electrode and the negative electrode. The sign "–" means that the corresponding member was not included. The column of "Number of cycles (number)" indicates that a cycle number n at a time when the capacity reached 80% after n cycles, relative to the initial capacity.

TABLE 1

| | Gel polymer layer | | | | | |
|---|---|---|---|---|---|---|
| | Kind of polymer | Post-polymer content (mass %) | Thickness (μm) | Position | Presence/ absence of sheet base member | Presence/ absence of solid electrolyte particles |
| Example 1 | PMMA | 2 | 30 | Between positive and negative electrodes | Present | — |
| Example 2 | PMMA | 2 | 100 | Between positive and negative electrodes | — | — |
| Example 3 | PMMA | 2 | 15 | On negative electrode side | Present | — |
| Example 4 | PMMA | 2 | 0.5 (Impregnation) | Negative electrode | — | — |
| Example 5 | PMMA | 2 | 15 | On positive electrode side | Present | — |
| Example 6 | PMMA | 2 | 0.5 (Impregnation) | Positive electrode | — | — |
| Example 7 | PMMA | 5 | 15 | On negative electrode side, On positive electrode side | Present | — |
| Example 8 | PMMA | 5 | 0.5 (Impregnation) | Positive electrode, Negative electrode | — | — |
| Example 9 | PMMA | 2 | 0.5 (Impregnation) | Negative electrode | — | — |
| Example 10 | PMMA | 2 | 0.5 (Impregnation) | Positive electrode | — | — |
| Example 11 | PVdF | 0.5 | 0.5 (Impregnation) | Negative electrode | — | — |
| Example 12 | PVdF | 10 | 0.5 (Impregnation) | Negative electrode | — | — |
| Example 13 | PMMA | 3 | 0.1 (Impregnation) | Negative electrode | — | — |
| Example 14 | PMMA | 3 | 300 | On negative electrode side | — | — |
| Example 15 | PAN | 5 | 0.5 (Impregnation) | Negative electrode | — | — |
| Example 16 | PEO | 5 | 0.5 (Impregnation) | Negative electrode | — | — |
| Example 17 | PMMA | 2 | 0.5 (Impregnation) | Negative electrode | — | — |
| Example 18 | PMMA | 2 | 0.5 (Impregnation) | Negative electrode | — | — |
| Example 19 | PMMA | 2 | 0.5 (Impregnation) | Negative electrode | — | — |

TABLE 1-continued

| | | | | | | |
|---|---|---|---|---|---|---|
| Comparative Example 1 | — | — | — | — | — | — |
| Comparative Example 2 | PMMA | 2 | 15 | On negative electrode side | — | LZCP |
| Comparative Example 3 | PMMA | 2 | 10 | On negative electrode side | — | Alumina |

| | Separator | | | Negative | Battery characteristics | |
|---|---|---|---|---|---|---|
| | Presence/ absence of separator (Kind) | Material | Presence/ absence of solid electrolyte layer | electrode active material | Rate characteristics C3/C0.2 | Number of cycles (Number) |
| Example 1 | — | — | — | $Nb_2TiO_7$ | 0.86 | 6100 |
| Example 2 | — | — | — | $Nb_2TiO_7$ | 0.82 | 6000 |
| Example 3 | Nonwoven fabric | Cellulose | — | $Nb_2TiO_7$ | 0.88 | 6300 |
| Example 4 | Nonwoven fabric | Cellulose | — | $Nb_2TiO_7$ | 0.95 | 6500 |
| Example 5 | Nonwoven fabric | Cellulose | — | $Nb_2TiO_7$ | 0.86 | 6200 |
| Example 6 | Nonwoven fabric | Cellulose | — | $Nb_2TiO_7$ | 0.95 | 6300 |
| Example 7 | Nonwoven fabric | Cellulose | — | $Nb_2TiO_7$ | 0.88 | 6500 |
| Example 8 | Nonwoven fabric | Cellulose | — | $Nb_2TiO_7$ | 0.92 | 7000 |
| Example 9 | Organic fiber layer | Polyamide-imide | LATP | $Nb_2TiO_7$ | 0.92 | 8000 |
| Example 10 | Organic fiber layer | Polyamide-imide | LZCP | $Nb_2TiO_7$ | 0.90 | 7800 |
| Example 11 | Nonwoven fabric | Polyethylene | — | $Nb_2TiO_7$ | 0.89 | 6200 |
| Example 12 | Nonwoven fabric | Polypropylene | — | $Nb_2TiO_7$ | 0.89 | 6000 |
| Example 13 | Nonwoven fabric | Cellulose | — | $Nb_2TiO_7$ | 0.97 | 5900 |
| Example 14 | Nonwoven fabric | Cellulose | — | $Nb_2TiO_7$ | 0.81 | 5800 |
| Example 13 | Nonwoven fabric | Cellulose | — | $Nb_2TiO_7$ | 0.94 | 6200 |
| Example 16 | Nonwoven fabric | Cellulose | — | $Nb_2TiO_7$ | 0.95 | 6100 |
| Example 17 | Nonwoven fabric | Cellulose | — | $Li_4Ti_5O_{12}$ | 0.97 | 12000 |
| Example 18 | Nonwoven fabric | Cellulose | — | $Li_{2.2}Nat_{1.7}Ti_{5.7}Nb_{0.3}O_{14}$ | 0.94 | 6800 |
| Example 19 | Nonwoven fabric | Cellulose | — | $TiO_2(B)$ | 0.93 | 5900 |
| Comparative Example 1 | Nonwoven fabric | Cellulose | — | $Nb_2TiO_7$ | 0.76 | 2500 |
| Comparative Example 2 | Nonwoven fabric | Cellulose | — | $Nb_2TiO_7$ | 0.90 | 4200 |
| Comparative Example 3 | Nonwoven fabric | Cellulose | — | $Nb_2TiO_7$ | 0.62 | 1900 |

From Table 1, the following is understood.

When the gel polymer layer is impregnated in at least one of the positive electrode and the negative electrode, the rate characteristics tend to be excellent. It is considered that one reason for this is that positive electrode active material particles and/or negative electrode active material particles are covered with the gel electrolyte, and thus protons do not easily move to the counter-electrode. Specifically, there is a tendency that gas generation at the positive electrode and/or negative electrode can easily be suppressed.

Even when the gel polymer layer was not impregnated in the positive or negative electrode, excellent rate characteristics and cycle life characteristics were successfully achieved by the presence of the gel polymer layer between the positive and negative electrodes. Even when the gel polymer layer was disposed on only the positive electrode side, or even when the gel polymer layer was disposed on only the negative electrode side, the above advantageous effects were obtained. Furthermore, as shown in Examples 1 and 2, even when only the gel polymer layer was provided between the positive and negative electrodes, excellent rate characteristics and cycle life characteristics were successfully achieved.

As shown in Examples 3, 15 and 16, even when the kind of polymer material included in the gel polymer layer was changed, excellent rate characteristics and cycle life characteristics were successfully achieved. As shown in Examples 17 to 19, even when the kind of negative electrode active material was changed, excellent rate characteristics and cycle life characteristics were successfully achieved.

As shown in Comparative Example 1, in the case of the secondary battery which does not include the gel polymer layer and includes only the separator, it is understood that the rate characteristics and cycle life characteristics are poorer.

As shown in Comparative Example 2, when the gel polymer layer further includes the solid electrolyte particles (LZCP), the cycle life characteristics are poorer. The reason for this is considered to be that the weight of the gel electrolyte decreased and the gas generation suppression effect lowered.

Since the alumina used in Comparative Example 3 does not have lithium ion conductivity, the battery characteristics were poorer than in Comparative Example 2.

According to at least one of the above-described embodiments and Examples, an electrode group is provided. The electrode group includes a positive electrode, a negative electrode, and a gel polymer layer interposed between the positive electrode and the negative electrode. At least a part of the negative electrode is opposed to the positive electrode. The gel polymer layer is formed of a gel electrolyte composed of a polymer material, an organic solvent and a lithium salt, and a sheet base member which supports the gel electrolyte, or the gel polymer layer is formed of only the gel electrolyte. Since the gel polymer layer can suppress the proton motion between the positive and negative electrodes, the electrode group according to the first embodiment can realize a secondary battery which exhibits excellent input/output characteristics and cycle life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode group comprising:
a positive electrode including a positive electrode current collector and a positive electrode active material-containing layer;
a negative electrode including a negative electrode current collector and a negative electrode active material-containing layer; and
a gel polymer layer interposed between at least a portion of the positive electrode active material-containing layer and at least a portion of the negative electrode active material-containing layer,
the gel polymer layer being formed of a gel electrolyte consisting of a polymer material, a first organic solvent and a first lithium salt, and a sheet base member which supports the gel electrolyte,
wherein the gel polymer layer holds a liquid-state nonaqueous electrolyte comprising a second organic solvent and a second lithium salt in the gel polymer layer,
wherein the sheet base member is an organic fiber layer including at least one organic material selected from the group consisting of: polyamide-imide, polyetherimide, polyimide, polyvinylidene fluoride, polyethylene, polypropylene, polytetrafluoroethylene, polyphenylenesulfide, liquid crystal polyester, polyether sulfone, polyether ketone, polyether ether ketone, polyethylene terephthalate, cellulose, polyolefin, polyketone, polysulfone, and polyvinyl alcohol, and
a moisture content in the negative electrode active material-containing layer is in a range of 150 ppm to 500 ppm.

2. The electrode group according to claim 1, wherein at least a part of the gel polymer layer is impregnated in at least one of the positive electrode or the negative electrode.

3. The electrode group according to claim 1, wherein the electrode group comprises only the gel polymer layer between the positive electrode and the negative electrode.

4. The electrode group according to claim 1, further comprising a separator interposed between the positive electrode and the negative electrode.

5. The electrode group according to claim 1, wherein a thickness of the gel polymer layer is in a range of 0.01 μm to 300 μm.

6. The electrode group according to claim 1, wherein a ratio of a mass of the polymer material in the gel electrolyte is in a range of 0.5 mass % to 10 mass %.

7. The electrode group according to claim 1, wherein a concentration of the first lithium salt in the gel electrolyte is in a range of 0.5 mol/L to 3 mol/L.

8. The electrode group according to claim 1, wherein the negative electrode active material-containing layer comprises a niobium titanium composite oxide.

9. The electrode group according to claim 8, wherein the niobium titanium composite oxide is a monoclinic niobium titanium composite oxide,
the monoclinic niobium titanium composite oxide is at least one selected from the group consisting of a composite oxide expressed by a general formula, $Li_xTi_{1-y}M1_yNb_{2-z}M2_zO_{7+\delta}$, and a composite oxide expressed by a general formula, $Li_xTi_{1-y}M3_{y+z}Nb_{2-z}O_{7+\delta}$,
the M1 is at least one selected from the group consisting of Zr, Si, and Sn, the M2 is at least one selected from the group consisting of V, Ta, and Bi, and the M3 is at least one selected from the group consisting of Mg, Fe, Ni, Co, W, Ta, and Mo, and
the x satisfies $0 \leq x \leq 5$, the y satisfies $0 \leq y < 1$, the z satisfies $0 \leq z < 2$, and the $\delta$ satisfies $-0.3 \leq \delta \leq 0.3$.

10. A secondary battery comprising:
the electrode group according to claim 1; and
a nonaqueous electrolyte containing the liquid-state nonaqueous electrolyte.

11. A battery pack comprising the secondary battery according to claim 10.

12. The battery pack according to claim 11, further comprising:
an external power distribution terminal; and
a protective circuit.

13. The battery pack according to claim 11, wherein
the battery pack comprises a plurality of the secondary battery, and
the plurality of the secondary battery are electrically connected in series, or in parallel, or in series and in parallel in a combined manner.

14. A vehicle comprises the battery pack according to claim 11.

15. The vehicle according to claim 14, further comprising a mechanism configured to convert kinetic energy of the vehicle to regenerative energy.

16. The electrode group according to claim 1, wherein the polymer material contains polymer chains being three-dimensionally intertwined, and the liquid-state nonaqueous electrolyte is held in an inside of the polymer chains.

17. The electrode group according to claim 1, wherein at least a part of the gel polymer layer is impregnated in at least one of the positive electrode active material-containing layer or the negative electrode active material-containing layer.

18. The electrode group according to claim 1, wherein the gel polymer layer is interposed between the positive electrode active material-containing layer and the negative electrode active material-containing layer.

19. The electrode group according to claim 1, wherein the polymer material is at least one kind selected from the group consisting of polyvinylidene fluoride, polyacrylonitrile, polymethyl methacrylate and polyethylene oxide.

* * * * *